(12) United States Patent
Raby

(10) Patent No.: US 11,737,854 B2
(45) Date of Patent: Aug. 29, 2023

(54) REMOVABLE ORTHODONTIC APPLIANCE SYSTEM

(71) Applicant: 3M INNOVATIVE PROPERTIES COMPANY, St. Paul, MN (US)

(72) Inventor: Richard E. Raby, Lino Lakes, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 869 days.

(21) Appl. No.: 16/493,140

(22) PCT Filed: Mar. 8, 2018

(86) PCT No.: PCT/IB2018/051524
§ 371 (c)(1),
(2) Date: Sep. 11, 2019

(87) PCT Pub. No.: WO2018/167616
PCT Pub. Date: Sep. 20, 2018

(65) Prior Publication Data
US 2020/0113652 A1 Apr. 16, 2020

Related U.S. Application Data

(60) Provisional application No. 62/471,650, filed on Mar. 15, 2017.

(51) Int. Cl.
*A61C 7/08* (2006.01)
*B33Y 80/00* (2015.01)
(Continued)

(52) U.S. Cl.
CPC ............... *A61C 7/08* (2013.01); *A61C 9/004* (2013.01); *B33Y 80/00* (2014.12); *B33Y 10/00* (2014.12)

(58) Field of Classification Search
CPC .... A61C 7/08; A61C 7/10; A61C 7/36; A61C 7/00
See application file for complete search history.

(56) References Cited

U.S. PATENT DOCUMENTS 3,835,540 A * 9/1974 Biederman ............... A61C 7/10
433/7
4,642,126 A 2/1987 Zador
(Continued)

FOREIGN PATENT DOCUMENTS

| EP | 2008636 | 12/2010 |
| EP | 2581062 | 4/2013 |

(Continued)

OTHER PUBLICATIONS

International Search report for PCT International Application No. PCT/IB2018/051524 dated Jun. 6, 2018, 3 pages.

*Primary Examiner* — Edward Moran
*Assistant Examiner* — Matthew P Saunders

(57) ABSTRACT

A dental appliance includes a first polymeric shell portion having one or more cavities shaped therein to removably conform to one or more teeth. The dental positioning appliance further includes at least one spacer. At least one spacer is coupled to the first polymeric shell portion. The dental appliance can also have a first arch member coupled to the at least one spacer and configured to provide at least some of a force needed to reposition one or more teeth from a first orientation to a second orientation different from the first orientation.

19 Claims, 27 Drawing Sheets

(51) Int. Cl.
*A61C 9/00* (2006.01)
*B33Y 10/00* (2015.01)

(56) References Cited

U.S. PATENT DOCUMENTS

| | | | |
|---|---|---|---|
| 4,652,274 A | 3/1987 | Boettcher | |
| 4,793,803 A * | 12/1988 | Martz | A61C 7/08 433/6 |
| 5,067,896 A | 11/1991 | Korn | |
| 5,267,855 A | 12/1993 | Tuneberg | |
| 6,845,175 B2 | 1/2005 | Kopelman | |
| 7,027,642 B2 | 4/2006 | Rubbert | |
| 7,234,937 B2 | 6/2007 | Sachdeva | |
| 7,731,495 B2 | 1/2010 | Eisenberg | |
| 8,194,067 B2 | 6/2012 | Raby | |
| 8,308,478 B2 | 11/2012 | Primus | |
| 8,329,776 B2 | 12/2012 | Hecht | |
| 8,356,993 B1 | 1/2013 | Marston | |
| 8,491,306 B2 | 7/2013 | Raby | |
| 8,738,165 B2 | 5/2014 | Cinader, Jr. | |
| 8,897,902 B2 | 11/2014 | See | |
| 9,295,617 B2 | 3/2016 | Eckert | |
| 9,402,695 B2 | 8/2016 | Curiel | |
| 9,498,302 B1 | 11/2016 | Patel | |
| 10,426,574 B2 | 10/2019 | Raby et al. | |
| 10,874,483 B2 * | 12/2020 | Boronkay | A61C 7/146 |
| 2001/0041320 A1 * | 11/2001 | Phan | A61C 19/00 433/24 |
| 2002/0192617 A1 * | 12/2002 | Phan | A61C 19/003 433/18 |
| 2003/0219690 A1 | 11/2003 | Graham | |
| 2003/0224311 A1 * | 12/2003 | Cronauer | A61C 7/08 433/20 |
| 2004/0029068 A1 | 2/2004 | Sachdeva | |
| 2004/0058295 A1 | 3/2004 | Bergersen | |
| 2005/0277084 A1 | 12/2005 | Cinader | |
| 2006/0099544 A1 * | 5/2006 | Lai | A61C 7/08 433/6 |
| 2007/0031791 A1 | 2/2007 | Cinader, Jr. | |
| 2007/0283967 A1 | 12/2007 | Bailey | |
| 2008/0096162 A1 | 4/2008 | Bardach | |
| 2009/0220920 A1 | 9/2009 | Primus | |
| 2010/0068671 A1 * | 3/2010 | Kakavand | A61C 7/08 433/6 |
| 2010/0279245 A1 | 11/2010 | Navarro | |
| 2011/0039223 A1 | 2/2011 | Li | |
| 2011/0129786 A1 * | 6/2011 | Chun | A61C 7/08 29/896.11 |
| 2012/0015314 A1 * | 1/2012 | Phan | A61C 7/36 433/24 |
| 2013/0089828 A1 | 4/2013 | Borovinskih | |
| 2013/0209952 A1 | 8/2013 | Kuo | |
| 2015/0132707 A1 | 5/2015 | Huang | |
| 2015/0182305 A1 * | 7/2015 | Lowe | A61C 7/008 433/2 |
| 2015/0257856 A1 * | 9/2015 | Martz | A61C 7/145 433/6 |
| 2015/0305832 A1 * | 10/2015 | Patel | A61C 7/08 433/6 |
| 2015/0320532 A1 | 11/2015 | Matty | |
| 2016/0067014 A1 * | 3/2016 | Kottemann | A61C 7/36 433/24 |
| 2016/0310236 A1 * | 10/2016 | Kopelman | A61C 7/14 |
| 2017/0007361 A1 * | 1/2017 | Boronkay | A61C 7/002 |
| 2017/0007368 A1 * | 1/2017 | Boronkay | A61C 7/002 |
| 2018/0318044 A1 | 11/2018 | Tal | |
| 2021/0093419 A1 * | 4/2021 | Boronkay | A61C 7/14 |
| 2021/0393374 A9 * | 12/2021 | Boronkay | A61C 7/14 |

FOREIGN PATENT DOCUMENTS

| | | |
|---|---|---|
| GB | 0814417 | 6/1959 |
| JP | H0349749 | 3/1991 |
| WO | WO 1998-058596 | 12/1998 |
| WO | WO 2001-080762 | 11/2001 |
| WO | WO 2004-004592 | 1/2004 |
| WO | WO 2007-084727 | 7/2007 |
| WO | WO 2018-005501 | 1/2018 |

* cited by examiner

REMOVABLE ORTHODONTIC APPLIANCE SYSTEM

CROSS REFERENCE TO RELATED APPLICATIONS

This application is a national stage filing under 35 U.S.C. 371 of PCT/IB2018/051524, filed Mar. 8, 2018, which claims the benefit of U.S. Provisional Application No. 62/471,650, filed Mar. 15, 2017, the disclosure of which is incorporated by reference in its/their entirety herein.

BACKGROUND

This disclosure relates to orthodontics and, more particularly, dental appliances. The field of orthodontics is concerned with repositioning a patient's teeth for improved function and aesthetic appearance. The practice of orthodontics has traditionally relied on manual steps, such as the selection of proper appliances for the particular patient, placement of appliances in the mouth, and adjustment of appliances throughout treatment. More recently, advancement in technology has allowed some of these steps to be assisted through the use of computers. For example, computers can be used to guide the acquisition of data representing the teeth arrangement of an individual patient. Such data can then be used to visualize the patient's dentition to diagnose and assist in orthodontic treatment planning at any stage of treatment. Furthermore, such data can be used in manufacturing appliances, such as dental appliances, that are customized to the patient.

A dental appliance may be useful to treat orthodontic ailments. The appliance can be a clear plastic tray. The tray can include a molding portion that conforms to one or more teeth of a patient in a first position. Adjustment occurs by first setting up the teeth into desired future positions, which are slightly advanced from their current, maloccluded positions. A physical model of the teeth in these desired positions is then rendered, e.g., via three-dimensional (3D) printing, and a sheet of clear thermoplastic is heated and formed over the physical model, thereby reproducing the dental anatomy in the desired, relative positions. The excess material is then trimmed away, leaving only the teeth and, optionally, portions of gingiva. Each tray advances the teeth only a slight amount, typically 0.15 to 0.25 mm of crown displacement per aligner. As such, a series of trays are needed to advance the teeth incrementally toward a target dentition state having teeth displaced by several millimeters and/or tens of degrees. The trays can be typically made by thermoforming from a thermoplastic material which can lead to trays that suffer from mechanical deficiencies such as creeping back to its original form when heated.

Various techniques have used 3D printing over thermoforming, where thermoset resins, such as those used in a 3D printing processes, do not suffer from the mechanical deficiencies because the polymers are created from monomers or oligomers at the time of printing. Thermoset resins have no memory of a previous geometric shape.

Various dental appliances have added an arch member that is separate from a molded portion (which conforms to a tooth). This configuration can concentrate the stress on the arch member as opposed to the molded portion, however, the arch member may not typically have the strength to reposition teeth and can be fragile, lacking the robustness to withstand the abuses of appliance installation and removal. As a consequence, thin arch members can break in the mouth of the patient.

In addition, the arch member can lack the ability to provide adjustments to multiple axes of rotation across multiple teeth.

SUMMARY

Aspects of the present disclosure provide for a dental appliance. A dental appliance includes a first polymeric shell portion having one or more cavities shaped therein to removably conform to one or more teeth. The dental positioning appliance further includes at least one spacer. At least one spacer is coupled to the first polymeric shell portion. The dental appliance can also have a first arch member coupled to the at least one spacer and configured to provide at least some of a force needed to reposition one or more teeth from a first orientation to a second orientation different from the first orientation. Another aspect of the present disclosure is a method of orthodontic cosmetic treatment. The method includes measuring a dental structure of a patient. The method also includes determining a prescribed tooth movement to the dental structure. The method also includes forming the dental appliance based on the prescribed tooth movement.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
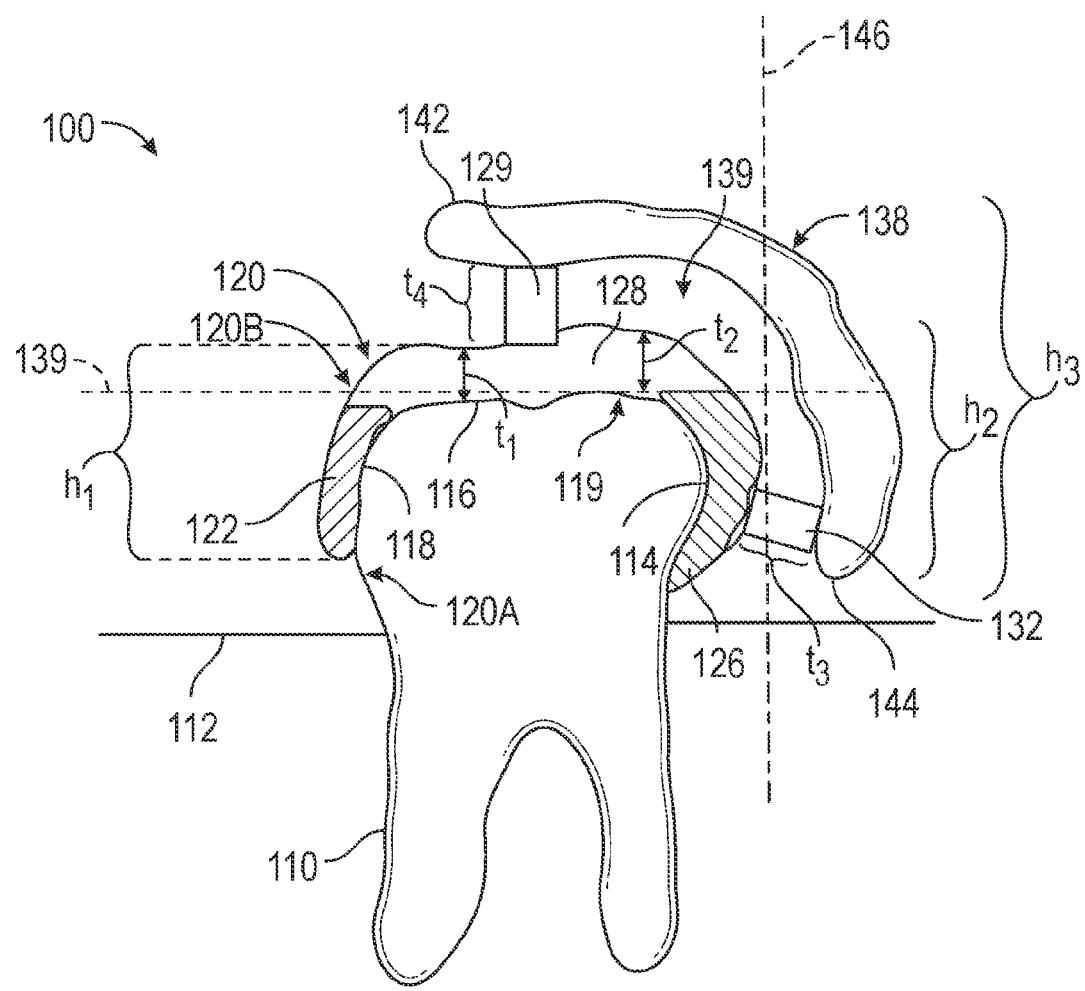
FIG. 1 illustrates a sagittal cross-section view of a polymeric shell portion shown removably conformed to a tooth.
Figure 2A:
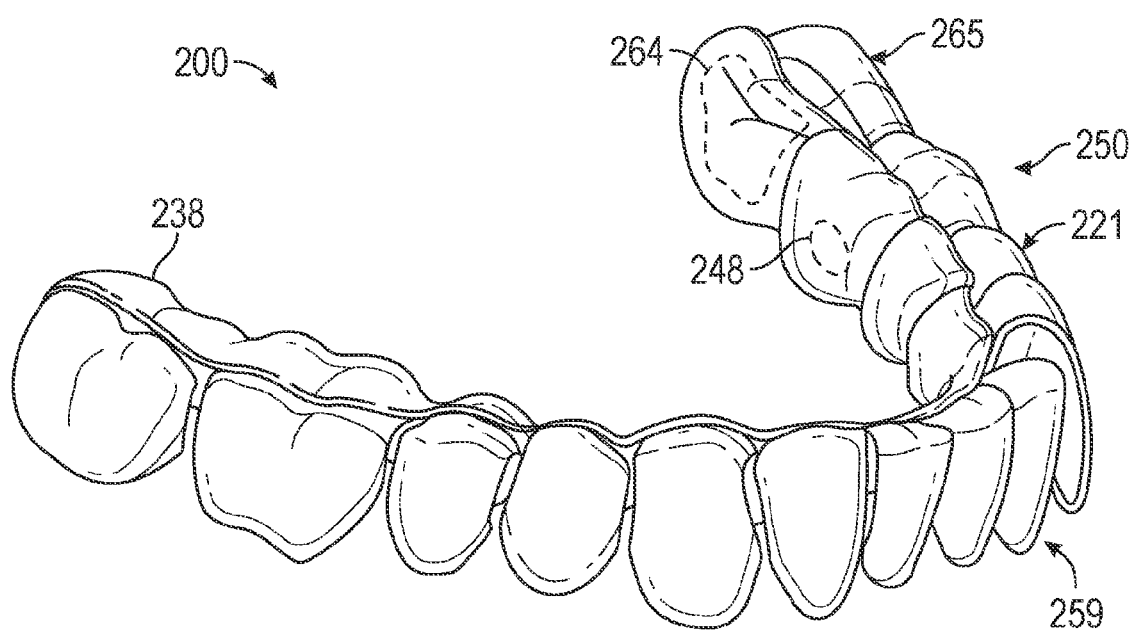
FIG. 2A illustrates an oblique occlusal/facial/right-lateral view of a dental appliance for a mandibular arch, wherein the arch member covers the lingual surfaces of the anterior tooth shells and covers the lingual surfaces, plus some of the occlusal surfaces, of the posterior tooth shells.
Figure 2B:
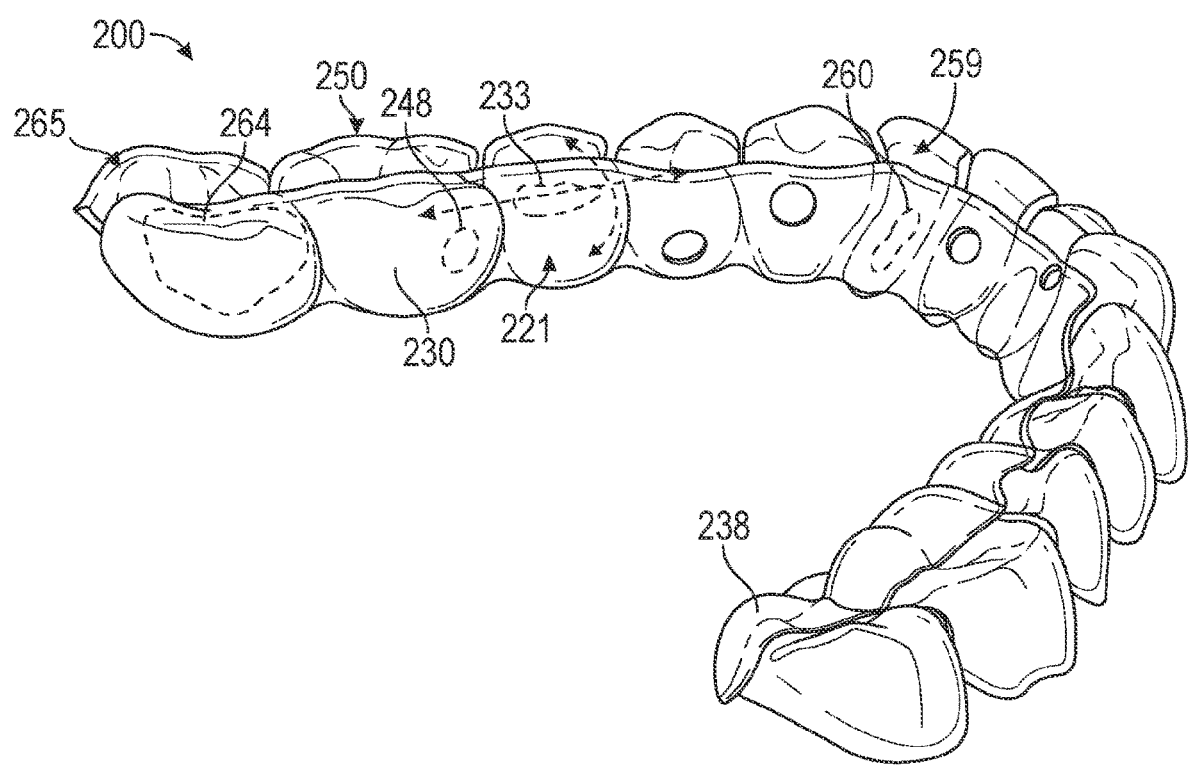
FIG. 2B illustrates an oblique occlusal/lingual/right-lateral view of the dental appliance shown in FIG. 2A.
Figure 2C:
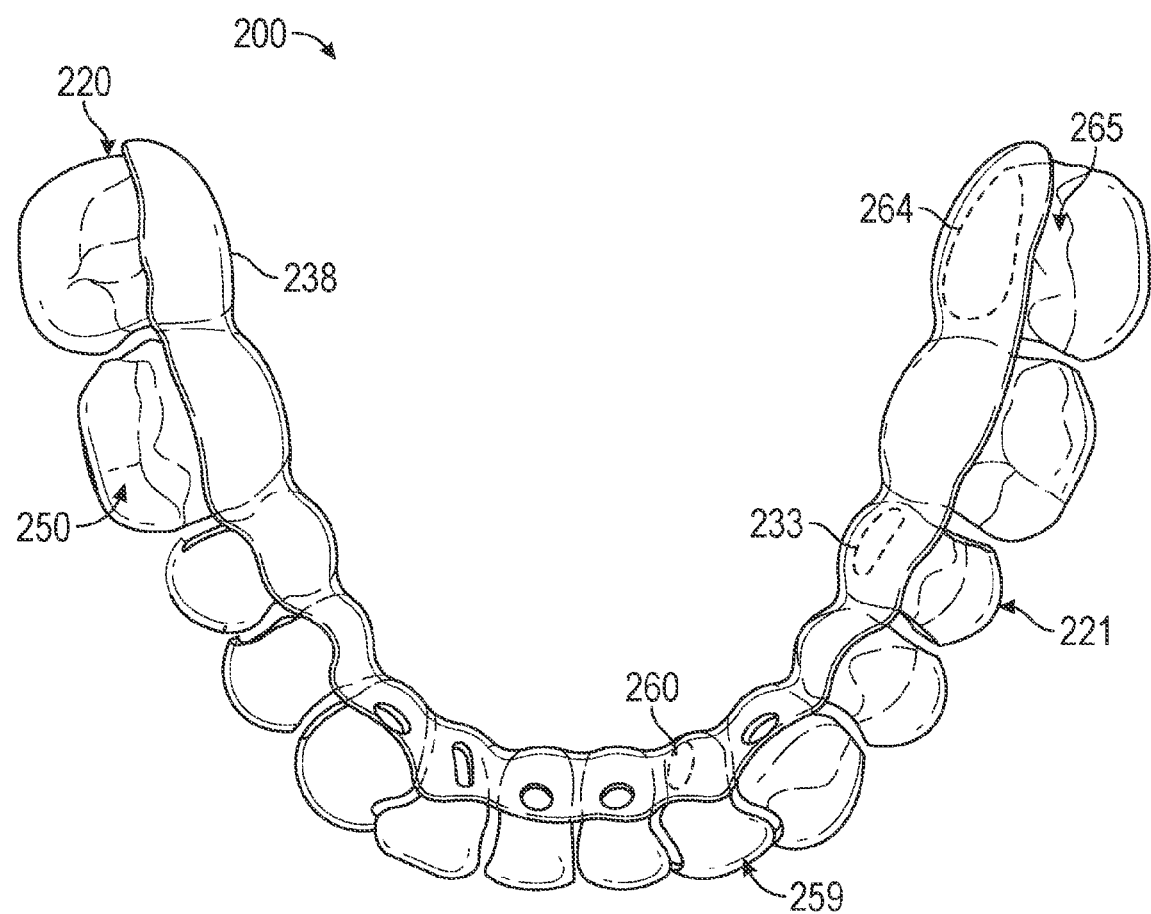
FIG. 2C illustrates an occlusal view of the dental appliance shown in FIG. 2A.
Figure 2D:
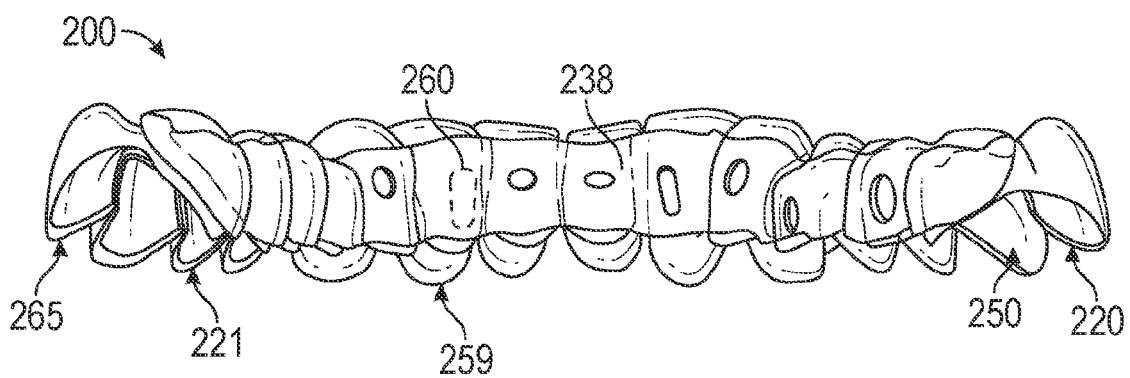
FIG. 2D illustrates a lingual view of the dental appliance shown in FIG. 2A.
Figure 2E:
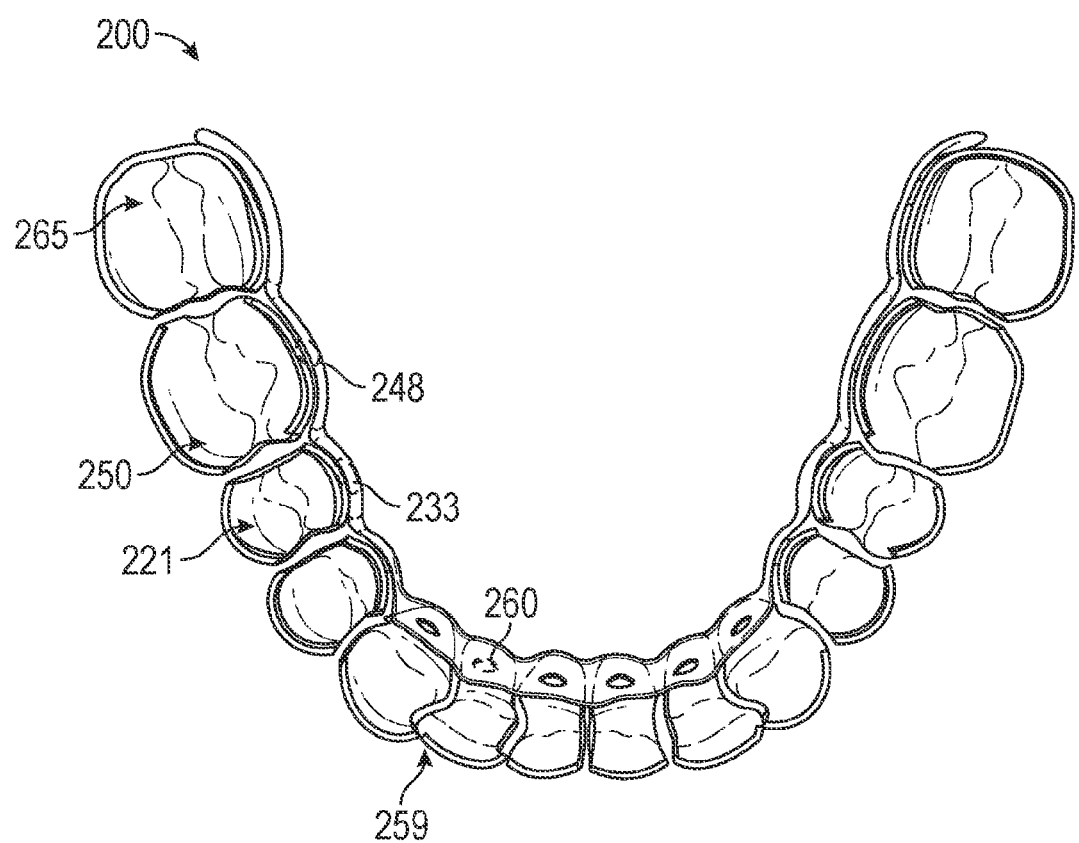
FIG. 2E illustrates a gingival view of the dental appliance shown in FIG. 2A.

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Definitions

As used herein:

"Mesial" means in a direction toward the midline of the patient's dental arch, along the curve.

"Distal" means in a direction more distant from or away from the midline of the patient's dental arch, along the curve.

"Occlusal" generally means pertaining to the biting surfaces of the teeth, or as a direction, toward the occlusal plane or the occlusal surfaces of the teeth.

"Gingival" means in a direction toward the patient's gums or gingiva.

"Facial" means in a direction toward the face of a tooth, which is usually outward facing from the center of the mouth. This term may be used interchangeably with "labial" and "buccal" when the specific location of the tooth in the dental arch is not important.

"Labial" means in a direction toward the patient's lips. It is used synonymously with "facial" but only in reference to the anterior teeth.

"Buccal" means in a direction toward the patient's cheek. It is used synonymously with "facial" but only in reference to the posterior teeth.

"Lingual" means in a direction toward the patient's tongue. "Oral" means the inner surface of a tooth toward the tongue or palate. The term "oral" may be used as an umbrella term for lingual or palatal.

"Vestibular" means the outer surface toward the cheek or lips. The term "vestibular" may be used as an umbrella term for buccal, labial or facial.

"Biting surface" may be used as an umbrella term for the occlusal or incisal surface of a tooth, depending on tooth type.

"Proximal" means near or in the vicinity of.

"Coupled" means physically coupled together either directly or indirectly. Indirect coupling can occur through other components. Direct coupling can also refer to two members being integrally formed or adhered together. For example, a spacer can be coupled to an arch member by being integrally formed with an arch member.

"Cavity" means a hollow space inside a polymeric shell portion and encased by the polymeric shell portion. A polymeric shell portion, as described herein, can have one or more cavities (e.g., a first cavity and/or a second cavity) adapted to receive or conform to a tooth. For example, at least one first cavity is formed from the polymeric shell portion and adapted to receive a tooth. The sidewalls of the polymeric shell portion are considered part of the first cavity. The first cavity can have one or more second cavities which can each be formed from the polymeric shell portion and be adapted to encompass a cusp or other topographical feature of the tooth. A plurality of cusps of the tooth can be received in a plurality of second cavities. It is possible for a first cavity to be adapted to receive a plurality of teeth (either fixed or mobile teeth (e.g., a bridge)). As used herein, "cavity" refers to either the first cavity, the second cavity, or both unless explicitly stated.

DETAILED DESCRIPTION

An aspect of the present disclosure is that a spacer provides at least some of the forces needed to reposition teeth through the arch member. This configuration can provide fine-tuned adjustments to the axis of rotation in each tooth. In some embodiments, aspects of the present disclosure also provides for a robust arch member.

The sections below describe illustrative embodiments directed to dental appliances and methods related thereto. These embodiments are exemplary and accordingly should not be construed to unduly limit the invention. For example, it is to be understood that one of ordinary skill can adapt the disclosed appliances and methods for attachment to either the labial or lingual surfaces of teeth, to different teeth within the same dental arch (for example, corresponding appliances on mesial and distal halves of the dental arch), or to teeth located on either the upper or lower dental arches.

The appliances and methods described herein may optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, elastomeric, and composite materials known to those skilled in the art. Further, unless otherwise indicated, dimensions associated with the appliances and their components are not critical and the accompanying drawings are not necessarily drawn to scale.

The dental appliance of this embodiment and other embodiments, unless otherwise indicated, are described herein using a reference frame attached to a surface of a tooth on the upper or lower jaw. Consequently, terms such as labial, lingual, mesial, distal, occlusal, and gingival used to describe the dental appliance are relative to the chosen reference frame. The embodiments, however, are not limited to the chosen reference frame and descriptive terms, as the dental appliance may be used on other teeth and in other orientations within the oral cavity. For example, the dental appliance may also be coupled to the labial or buccal surface of the tooth.

Those of ordinary skill in the art will recognize that the descriptive terms used herein may not directly apply when there is a change in reference frame. Nevertheless, the embodiments are intended to be independent of location and orientation within the oral cavity and the relative terms used to describe embodiments of the orthodontic appliance are to merely provide a clear description of the embodiments in the drawings. As such, the relative terms labial (or buccal), lingual, mesial, distal, occlusal, and gingival are in no way limiting the embodiments to a particular location or orientation.

In FIG. 1, a portion of a dental appliance 100 is shown coupled to a single tooth 110. As shown, the tooth 110 can be a second molar with a crown that is exposed and a root area below the gumline 112. The dental appliance 100 can couple to the crown, or even the neck, of the tooth 110.

The dental appliance 100 can have a first polymeric shell portion 120. The polymeric shell portion 120 can include one or more cavities shaped therein to removably conform to the tooth 110. For example, the polymeric shell portion 120 can be formed such that cusps of a tooth 110 fit into the one or more cavities 119 to prevent movement of the polymeric shell portion 120 relative to the tooth 110. The cavities do not necessarily cover a majority of the crown surface and can be abbreviated. Although the cavities can vary considerably in size, shape, and curvature, as do teeth, a cavity can generally be defined as a surface that encloses at least 90 degrees of arc; however, cavities enclosing smaller degrees of arc are possible, and the preceding definition should not be construed as a limiting factor.

The polymeric shell portion 120 can conform in such a manner that maintains tight tolerances with a tooth 110 and prevents movement of the first polymeric shell portion 120. Adhesive may also be used to further couple the first polymeric shell portion 120 to the tooth 110. In at least one embodiment, the polymeric shell portion 120 can contact a portion of at least one proximal surface (e.g., mesial/distal surfaces) of the tooth 110 and at least a portion of the vestibular and/or oral surface of the tooth 110.

For example, a cavity of the polymeric shell portion 120 can contact at least a portion of a proximal surface, facial surface 118, a lingual surface 114, an occlusal (or incisal) surface 116 of the tooth 110, or combinations thereof. The polymeric shell portion 120 can have separate portions that correspond to the various surfaces of the tooth 110. For example, the portion 128 can correspond to the occlusal surface 116 of the tooth 110, the portion 122 can correspond to the facial surface 118 of the tooth 110, and the portion 126 can correspond to the lingual surface 114 of the tooth 110.

In some embodiments, the boundaries between labial, occlusal, and lingual surfaces of teeth may be defined by the interfaces between upper and lower teeth when placed in occlusion. Thus, the boundary between an occlusal and labial, or lingual surface would be a jagged line that generally follows an occlusal plane. In some embodiments, it may also be advantageous for an arch member 138 to cross an occlusal plane boundary for reasons of mechanics in order to increase or decrease the rigidity of the arch member 138 in select locations.

Optionally, the boundaries between the portion 128 and either portion 126 or portion 122 can be established based in part by at least one plane parallel to the occlusal plane (i.e., line) 139 of the tooth. For example, the portion 128 can be established from a plane parallel to the occlusal plane 139 of the tooth 110 where the occlusal plane 139 intersects the polymeric shell portion 120. The occlusal plane 139 refers to an imaginary surface that theoretically touches the incisal edges of the incisors and the tips of the occluding surfaces of the posterior teeth. In at least one embodiment, the boundary between portion 128 and either portion 126 or portion 122 does not contact the occlusal surface 116 of the tooth 110. In another embodiment, the boundary between the portion 128 and either portion 126 or portion 122 does not extend past a plane 146 parallel to an axial plane of the tooth 110.

The polymeric shell portion 120 can have a first (inner) surface 120A having a first surface area defined by the one or more cavities 119. The first surface 120A can contact the tooth 110. The polymeric shell portion 120 can also have a second (outer) surface 120B opposite the first surface 120A and having a second surface area. The second surface 120B can form the outer portion of polymeric shell portion 120 and contact the tongue or oral mucosa of a patient. The first surface area is generally less than the second surface area due to the overall convexity of tooth 110.

The polymeric shell portion 120 can have a particular height $h_1$. In at least one embodiment, the height $h_1$ is defined by first surface 120A of the first polymeric shell portion 122 that contacts the facial surface 118 of a tooth 110. The height $h_2$ can be defined by the polymeric shell portion 122 that contacts the lingual surface 126 of the tooth 110. Either height $h_1$ or $h_2$ can be defined by a distance between an occlusal-most end of the polymeric shell portion 120 and a gingival-most end of the polymeric shell portion 120 along a plane parallel to an axial plane 146 of the tooth 110. The height of the polymeric shell portion 120 is determined from the greater of $h_1$ and $h_2$.

The polymeric shell portion 120 can have varying levels of thickness. The thickness of the polymeric shell portion 120 is dependent on the material properties and the amount of force applied by an arch member 138. For example, the thickness $t_1$ may be less than that of a thickness $t_2$ of a built out portion.

The dental appliance 100 can also have at least one spacer 132. As shown, the dental appliance 100 has two spacers, 132, and 129. A spacer can be coupled to the second surface 120B of the polymeric shell portion 120. In some embodiments, the spacer is formed integrally with the polymeric shell portion 120. The spacer can also be made from a material that is different than either the polymeric shell portion 120 or the arch member 138. In some embodiments, the polymeric shell portion 120 comprises a first polymeric component (described herein), and the first spacer 132 comprises a second polymeric component. In at least one embodiment, the first polymeric component has a higher modulus of elasticity than the second polymeric component (meaning that the second polymeric component is more flexible). For example, if the spacer 132 is flexible, then a stiffer arch member 138 can be used more like a rigid brace without relying on the arch member 138 to do work on polymeric shell portion 120

The second polymeric component can be made of an elastomeric polymer (e.g., an elastomer) having a relatively lower modulus of elasticity and higher elongation before break as compared with rigid polymers. Such properties allow mechanical stresses in the appliance 100 to concentrate in the spacers (e.g., 128, or 132) and result in greater strain deformation.

The first spacer 132 can be disposed on one of the surfaces of the polymeric shell portion 120 sufficient to cause pressure to be placed on a tooth 110 and, with the arch member 138, cause a net translation and/or rotation of the tooth. For example, rotation comes as a result of a force acting on a point that is displaced from an axis of rotation, i.e. a radius. The axis may be the center of resistance, or it may be the neutral axis formed by an opposing couple of forces, also displaced by a given radius. In some embodiments, the first spacer 132 is coupled to the second surface (i.e., an outer surface) of portion 126.

Each spacer has a thickness that is non-zero. For example, the first spacer 132 has a thickness $t_3$, and the second spacer 129 has a thickness $t_4$. The first spacer 132 provides a gap 139 formed between the polymeric shell portion 120 and at least a portion of an arch member 138 (described herein). The gap 139 can be equivalent to the thickness $t_3$ of the first spacer 132. Although various thicknesses are provided, it should be noted that the flexibility of the spacer is a function of its thickness, diameter, and modulus of elasticity. Specifically, increasing a diameter of a spacer will decrease the flexibility, while increasing the thickness of a spacer will increase the flexibility. The flexibility is also inversely proportional to the modulus of elasticity of the material. The shape and thickness of the polymeric shell portion 120 and arch member 138 also play a role in the overall flexibility of the system. As such, it is difficult to define a specific range of thicknesses without also defining these other parameters.

In some embodiments, the gap 139 is sufficient to allow a prescribed tooth movement without causing interference between the arch member 138 and the polymeric shell portion 120. For example, the gap 139 can also be sufficient to allow a prescribed tooth movement without allowing the arch member 138 to contact the polymeric shell portion 120. The gap thickness can be affected by the number of spacers.

The thickness $t_3$ can be defined by a distance from the second surface 120B of the first polymeric shell portion 120 to the arch member 138 in some embodiments. In at least one embodiment, the thickness $t_1$ or $t_2$ can generally be no greater than that of $t_3$, or $t_4$. In other embodiments, the thickness $t_3$ could be smaller than $t_1$ or $t_2$. For example, a spacer may be used as a pivot point to establish a center of rotation. Thus, a gap may have thickness equal to a spacer thickness in the immediate vicinity of the spacer and either increase or decrease in thickness at more distant points, depending on the rotation angle of the polymeric tooth shell 120 about the center of rotation. The thickness of the gap can also have nominal variation along surface 120B regardless of the active rotation angle about a spacer.

Thus, the distance between the polymeric tooth shell 120 and the arch member 138 is not necessarily uniform. The amount of space between these two surfaces depends on the prescribed motion of the tooth, including direction and magnitude. Translations and rotations need different amounts and shapes of space. For instance, a three-dimensional transform can include both translation and rotation, resulting in curvaceous motion paths. The arch member 138 can be designed to avoid interference with the polymeric tooth shell 120 over its prescribed motion path.

The dental appliance 100 can have an arch member 138. The first arch member 138 can transmit force between first shell portion 120 and optionally a second shell portion to reposition the one or more teeth 110. The arch member 138 can be a component that provides a force through a spacer 132 which is further applied to reposition the tooth 110. The arch member 138 can have one or more bends in the relaxed state. When stressed, the arch member 138 can apply forces without significant deformation of the polymeric shell portion 138.

The arch member 138 can have a particular height $h_3$. The height $h_3$ can be defined as a distance from the occlusal-most extent of the arch member 138 to the gingival-most end of the arch member 138 along an occluso-gingival axis of a tooth (e.g., 146). In some embodiments, the height $h_3$ of the arch member 138 can be defined as a distance from a first end 142 of the first arch member 138 to a second end 144 of the first arch member 138 along occluso-gingival axis 146. In at least one embodiment, the arch member 138 can be ribbon-shaped, meaning that the height $h_3$ of the arch member 138 is at least 10% of the height of the polymeric shell portion 120. For example, a wire-like arch member 138 can have a height that is about 6% of the height of the polymeric shell portion 120. In at least one embodiment, the height of the arch member is at least 10%, at least 20%, at least 30%, at least 40%, at least 50%, at least 60%, at least 70%, at least 80%, or at least 90% of the height of the polymeric shell portion 120 resulting in additional strength of polymeric dental appliances.

In at least one embodiment, the diameter of the spacer 132 can be no greater than the height $h_3$ of the arch member 138. In some embodiments, the diameter (e.g., measured from a largest circle that encompasses the spacer) can be no greater than 75%, no greater than 50%, or no greater than 25% of the height $h_3$ of the first arch member 138.

An aspect of the present disclosure is that the arch member 138 (inner surface) overlaps at least 10%, at least 20%, at least 30%, at least 40%, at least 50%, at least 60%, at least 70%, at least 80%, or at least 90% of the second surface area 120B of the polymeric shell portion 120. The arch member 138, when spread across a plurality of spacers in first polymeric shell portion 120, or optional second polymeric shell portion, can provide tunable adjustments to the axis of rotation or translation to reposition a tooth 110. Further, the arch member 138 can further overlap at least 5%, at least 10%, at least 20%, at least 30%, at least 40%, at least 50%, at least 60%, at least 70%, at least 80%, or at least 90% of the second surface area 120B of portion 128.

The arch member 138 and the spacer may both be resilient by virtue of being comprised of materials having similar modulus of elasticity and having dimensions that result in similar flexibilities. Although the arch member 138 may have some resiliency and thus provide some of the forces needed to reposition the teeth, at least some of the spacers are configured to provide at least some of the forces needed to reposition teeth. The spacer can be formed from an elastomeric material, or otherwise made more flexible by making its diameter relatively smaller than that of the arch member 138. In some embodiments, the spacer can be more resilient (i.e. lower modulus of elasticity) than the arch member 138 material.

In at least one embodiment, the first arch member 138 overlaps at least a portion of the second surface area of the portion 122 in addition to the portion 126.

The polymeric component of the present disclosure can correspond to the polymeric component of U.S. Application No. 62/356,871 Filed Jun. 30, 2016, which is incorporated by reference.

The polymeric component of the present disclosure includes at least one polymerizable component. A "polymerizable component," for reference purposes herein, comprises a hardenable component, such as a monomer or oligomer, that can be cured to provide a 3D printed article. In some embodiments, for instance, hardening comprises irradiating with electromagnetic radiation having sufficient energy to initiate a polymerization or cross-linking reaction. For instance, in some embodiments, ultraviolet (UV) radiation can be used.

In some embodiments, suitable polymerizable components contain at least one ethylenically unsaturated bond, and are capable of undergoing addition polymerization. Such free-radically polymerizable components include monomers or oligomers with (meth)acrylate segments and/or urethane segments. For example, polymerizable components can include mono-, di- or poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, the diurethane dimethacrylate called UDMA (mixture of isomers, e.g., Röhm Plex 6661-0) being the reaction product of 2-hydroxyethyl methacrylate (HEMA) and 2,2,4-trimethylhexamethylene diisocyanate (TMDI), glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, and trishydroxyethyl-isocyanurate trimethacrylate; the bis-acrylates and bis-methacrylates of polyethylene glycols of molecular weight 200-500, copolymerizable mixtures of acrylated monomers such as those in U.S. Pat. No. 4,652,274 (Boettcher et al.), and acrylated oligomers such as those of U.S. Pat. No. 4,642,126 (Zador et al.); and vinyl compounds such as styrene, diallyl phthalate, divinyl succinate, divinyl adipate and divinylphthalate; polyfunctional (meth)acrylates comprising urethane, urea or amide groups, as those of EP2008636 (Hecht et al.), or any combination thereof. The polymerizable component also may comprise silicone acrylate oligomers, epoxy (meth)acrylate oligomers, polyester (meth)acrylate oligomers or chlorinated polyester (meth)acrylates, allylic oligomers and (meth)acrylic oligomers. Mixtures of two or more of these free radically polymerizable components can be used if desired.

The polymerizable component preferably comprises one or more poly(meth)acrylates, for example, di-, tri-, tetra- or pentafunctional monomeric or oligomeric aliphatic, cycloaliphatic or aromatic acrylates or methacrylates. The polymerizable component, in presently preferred implementations, includes a high viscosity poly(meth)acrylate. The preferred poly(meth)acrylates for use in the polymeric component are not flowable at room temperature, having viscosities of over 20,000 cP at 25° C. As used herein "flowable" means that the polymerizable component deforms or flows under its own weight at room temperatures (e.g., 20-25° C.). In some embodiments described herein, a urethane (meth)acrylate or other poly(meth)acrylate has a viscosity ranging from about 20,000 cP to 300,000 cP at about 25° C. when measured in a manner consistent with ASTM D4287. Methacrylates can be particularly useful in embodiments in the present disclosure because of the printability and the ability to bond the product to a tooth. Polymeric shell portions made from methacrylate resins have been found to securely bond to the teeth using a methacrylate-based adhesive.

For example, the polymerizable component can include polyfunctional urethane acrylates or urethane methacrylates. These urethane (meth)acrylates are known to the person skilled in the art and can be prepared in a known manner by, for example, reacting a hydroxyl-terminated polyurethane with acrylic acid or methacrylic acid, or by reacting an isocyanate-terminated prepolymer with hydroxyalkyl (meth)acrylates to give the urethane (meth)acrylate. Suitable processes are disclosed, inter alia, in U.S. Pat. No. 8,329,776 (Hecht et al.) and U.S. Pat. No. 9,295,617 (Cub et al.). Suitable urethane methacrylates can include PEGDMA (polyethyleneglycol dimethacrylate having a molecular weight of approximately 400), aliphatic urethane methacrylates, aliphatic polyester urethane methacrylates, aliphatic polyester triurethane acrylates.

Polymeric components described herein can be mixed by known techniques. In some embodiments, for instance, a method for the preparation of a polymeric component described herein comprises the steps of mixing all or substantially all of the components of the polymeric component, melting the mixture, and filtering the molten mixture. Melting the mixture, in some embodiments, is carried out at a temperature of about 50° C. or in a range from about 50° C. to about 85° C. In some embodiments, a polymeric component described herein is produced by placing all or substantially all components of the composition in a reaction vessel and heating the resulting mixture to a temperature ranging from about 50° C. to about 85° C. with stirring. The heating and stirring are continued until the mixture attains a substantially homogenized molten state.

In FIG. 2A-2E, a dental appliance 200 is shown. In dental appliance 200, a plurality of polymeric shell portions are shown. The dental appliance 200 shown in FIGS. 2-6 can be similar to dental appliance 100 in FIG. 1, except that dental appliance 200 is shown with a plurality of polymeric shell portions that are coupled to an arch member 238 through a plurality of spacers.

A plurality of polymeric shell portions includes at least a first polymeric shell portion 265 and a second polymeric shell portion 250. Polymeric shell portions 221, and 259 are also shown. The polymeric shell portions described herein can be similar to the polymeric shell portion 120 shown in FIG. 1. The polymeric shell portions 221, 259, 265, and 250 are coupled to the arch member 238 through one or more spacers.

For example, portion 265 can couple to the arch member 238 through spacer 264, portion 250 can couple to the arch member 238 through spacer 248, portion 221 can couple to the arch member 238 through spacer 233, and portion 259 can couple to the arch member 238 through spacer 260.

The first polymeric shell portion 265 and second polymeric shell portion 250 can be distinguished from a polymeric shell portion that has two cavities because a first polymeric shell portion 265 is separate from a second polymeric shell portion 250, and each conform to an individual tooth (as opposed to a block of teeth).

A spacer can be of any dimensions sufficient to reposition a tooth, to maintain the position of a tooth, or to provide anchorage when moving other teeth. For example, repositionable forces can be focused on a surface area of no greater than 10 mm², no greater than 5 mm², or no greater than 1 mm². In other embodiments, it may be desirable to disperse the repositionable forces from the arch member 238 (such as when a particular tooth requires minimal correction). Each of spacers 233 and 260 can achieve an axis of rotation by being elongated. For example, an axis of rotation is formed along the axis of elongation 230 which can tip an underlying tooth of portion 221.

The first polymeric shell portion 265, a spacer 264 and a first arch member 238 can be formed as a single piece. In some embodiments, the polymeric shell portion 265, spacer 264, and first arch member 238 are molded together. In other embodiments, the second polymeric shell portion 250, spacer 248, and first arch member 238 can also be formed as a single piece with the first polymeric shell portion 265 and spacer 264. The forming can be performed, for example, through 3D printing, additive manufacturing, milling, or injection molding.

The arch member 238 can overlay a portion of the occlusal surface of the molar and bicuspids. The percentage of surface area that is overlaid may be different for each polymeric shell portion. An aspect of the present disclosure is that arch member 238 overlaps at least 10% of the surface area of the polymeric shell portion. In some embodiments, the arch member 238 overlaps less than 110% of the outer surface area of a polymeric shell portion.

Figure 3:
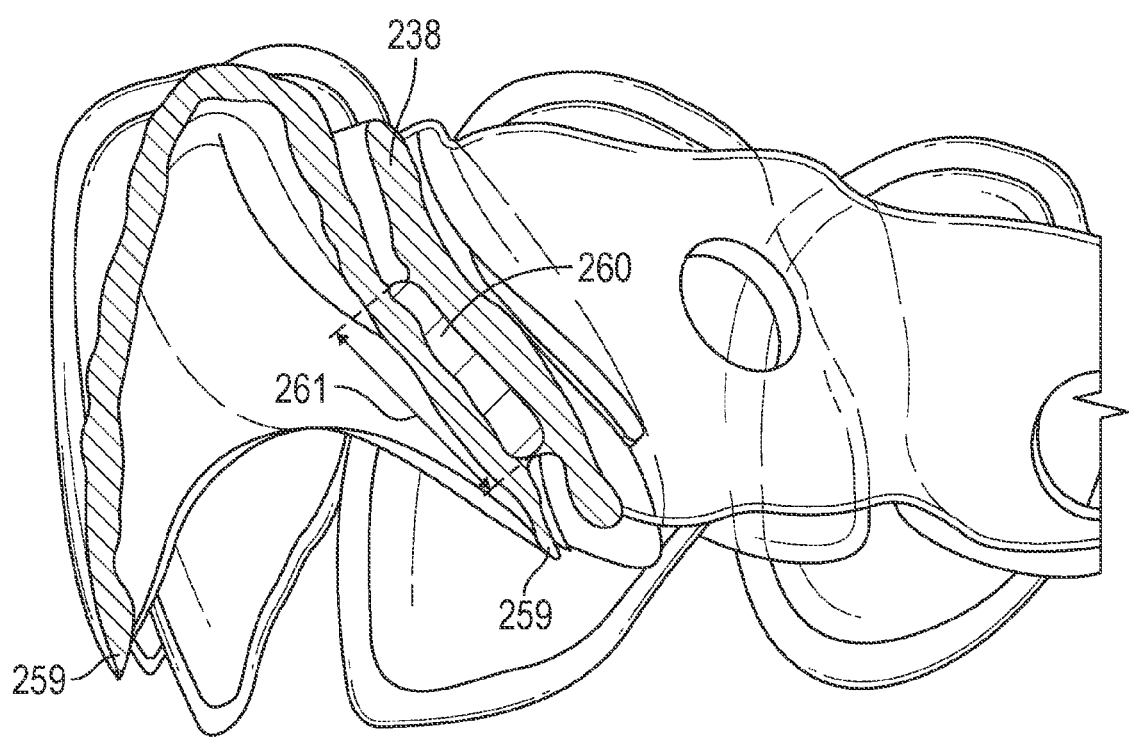
FIG. 3 illustrates a sagittal cross-section view of a polymeric shell portion of the dental appliance shown in FIG. 2A corresponding to the mandibular central incisor.
Figure 4:
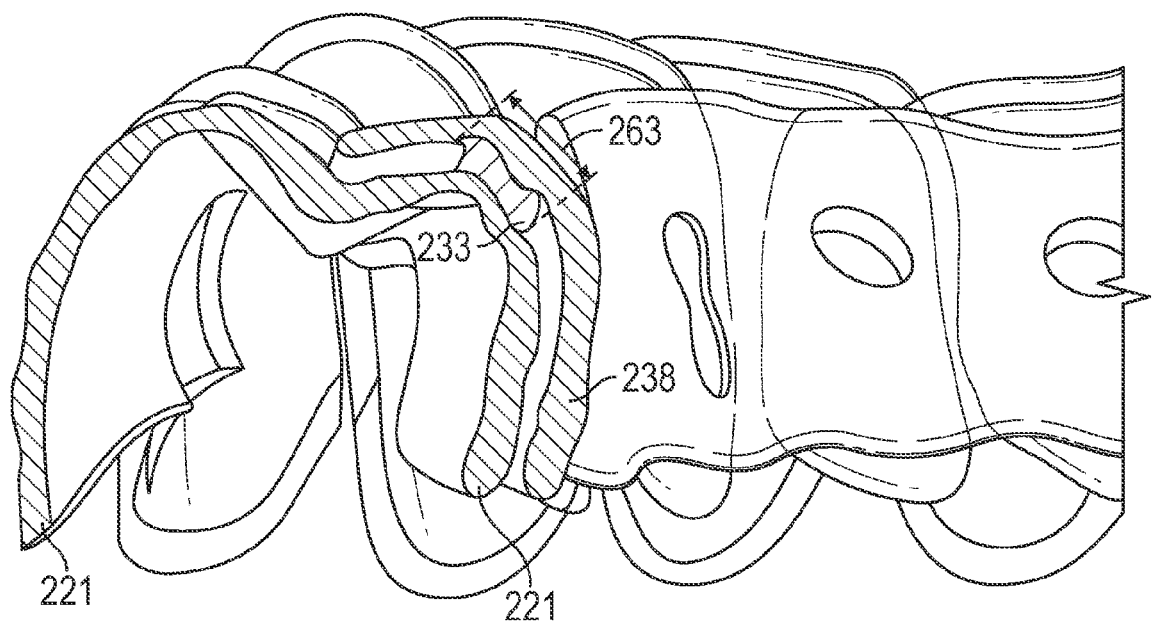
FIG. 4 illustrates a sagittal cross-section view of a polymeric shell portion of the dental appliance shown in FIG. 2A corresponding to the mandibular second bicuspid.
Figure 5:
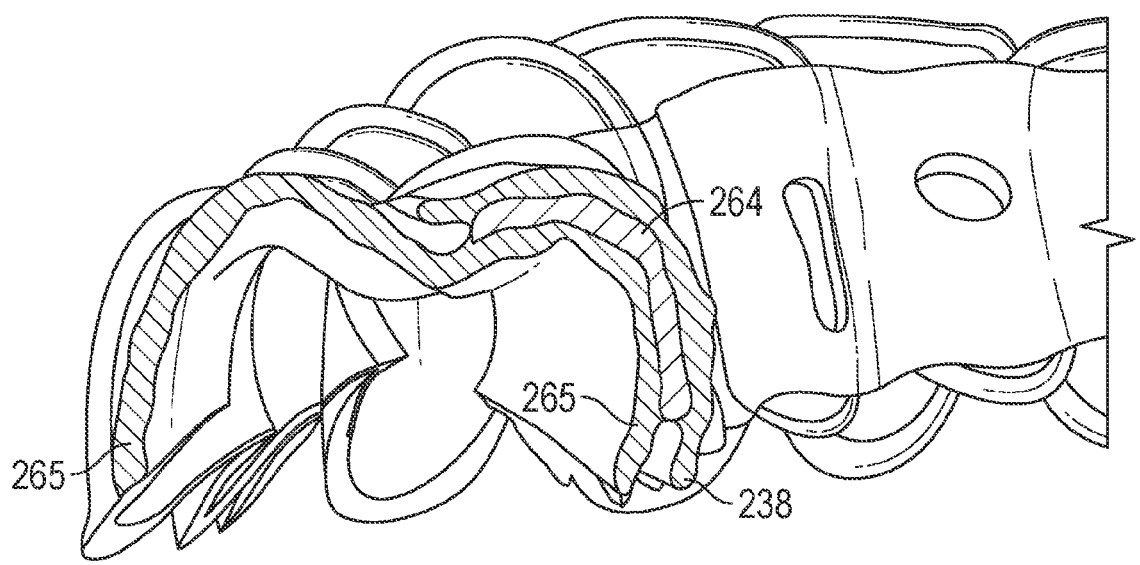
FIG. 5 illustrates a sagittal cross-section view of a polymeric shell portion of the dental appliance shown in FIG. 2A corresponding to a mandibular second molar.

FIGS. 3-5 highlight the various configurations of the plurality of spacers on the plurality of polymeric shell portions. A spacer can take nearly any shape sufficient to create an axis of rotation in an underlying tooth. In some embodiments, the spacer can function to create a gap between the arch member and the polymeric shell portion. The spacer can have a surface area that contacts the arch member. In some embodiments, the surface area that contacts the arch member is no greater than the second (outer) surface area of the polymeric shell portion. In other embodiments, the surface area of the spacer where it joins the shell portion is no greater than 90%, no greater than 80%, no greater than 70%, no greater than 60%, no greater than 50%, no greater than 40%, no greater than 30%, no greater than 20%, no greater than 10% of the surface area of the polymeric shell portion. The spacer is distinguished from a thick polymeric shell portion, because the smaller surface area relative to the polymeric shell portion can effectively result in a pronounced axis of rotation of the underlying tooth. Because the spacer is the weak point in the appliance comprising a polymeric shell portion, spacer, and arch member, the spacer under stress effectively acts as a pivot point about which the tooth can rotate. Bending and twisting modes of deformation are facilitated. However, compression, tension, and shear are also possible, thereby allowing for translation of the tooth.

In FIG. 3, the spacer 260, which is attached to polymeric shell portion 259 which is coupled to a lower incisor, can have a length 261. In FIG. 4, the spacer 233 can be coupled to the second polymeric shell portion 221. The spacer can be positioned on a portion corresponding to an occlusal surface of the tooth. The spacer 233 can have a length of 263. In FIG. 5, the spacer 264 can be coupled to the polymeric shell portion 265. The spacer can be positioned on a portion of the polymeric shell portion corresponding to the occlusal surface, and other surfaces, of the tooth. The spacer 233 can have a length measured along the curved outer surface of portion 265.

Figure 6:
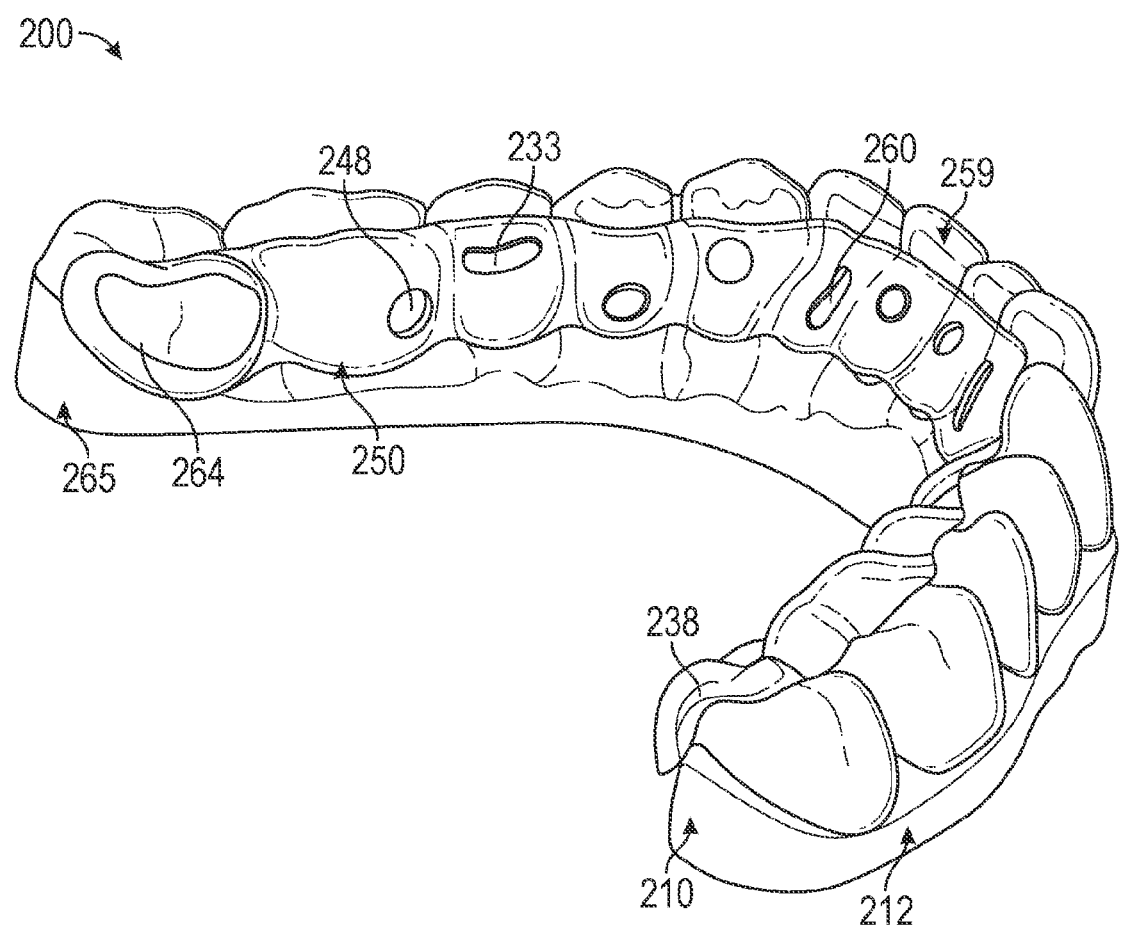
FIG. 6 illustrates an oblique occlusal/lingual/right-lateral view of the dental appliance shown in FIG. 2A, highlighting the spacers between the individual tooth shells and the arch member.

In FIG. 6, the dental appliance 200 is placed on a plurality of teeth 210 corresponding to a patient. A portion of the dental appliance 200 contacts the gingival area 212 of the patient. FIG. 6 generally illustrates a plurality of spacers, such as spacers 233, 248, 260, 264. In some embodiments, the spacers can contact at least a portion of a polymeric shell portion corresponding to a side surface of a tooth (e.g., the lingual or facial surface). Various spacers (e.g., spacers 233, 264) can also contact a portion of a polymeric shell portion corresponding to an occlusal surface of a tooth.

Any of the spacers can be a non-uniform thickness along its length. For example, a spacer with varying thickness can be useful in applying repositioning forces at particular angles.

In FIGS. 7A-7B, 8-10, a dental appliance 300 is shown. The dental appliance 300 can be similar to dental appliance 200 from FIGS. 2-6 except that dental appliance 300 has an arch member 338 that overlays a greater second surface area of at least one polymeric shell portion relative to a degree of overlay of dental appliance 200.

The dental appliance 300 can have a plurality of polymeric shell portions, such as polymeric shell portion 301, polymeric shell portion 302, and polymeric shell portion 303.

For example, the polymeric shell portion 301 can have a cavity formed therein for a bicuspid, the polymeric shell portion 302 can have a cavity formed therein for a central incisor, the polymeric shell portion 303 can have a cavity formed therein for a lateral incisor, etc.

Each of the plurality of polymeric shell portions can have one or more spacers. For example, the polymeric shell portion 301 has spacer 370 on the facial surface, the polymeric shell portion 302 has spacer 371 on the facial surface and spacer 372 on the lingual surface, and the polymeric shell portion 303 has spacer 373 on the occlusal surface, or more specifically, on the incisal edge.

In particular, since the arch member 338 overlays a surface of a polymeric shell portion, then multiple spacers on the lingual, facial, and/or occlusal surfaces of a tooth, or combinations thereof, may be helpful. The dental appliance 300 can apply correction forces from the facial surface and the lingual surface of a tooth, which can enable the use of a less rigid material in arch member 338 than used in traditional appliances, such as a polymer instead of a metal. The multiple spacers can further provide fine-tuned correction for teeth by applying force on the lingual surface toward the facial direction and/or applying force on the facial surface toward the lingual direction. An occlusal spacer, such as 373, can maintain the shape of the arch member 338 while rotating a tooth shell, such as 379, about an axis passing through the spacer.

In some embodiments, the occlusal spacer 373 may allow for rotation about the incisal edge of the tooth. For example, a first order rotation (about the long axis of the tooth) is prescribed. Spacer 373 is in torsion so that it rotates about a vertical axis. In some embodiments, an occlusal spacer 373 can also be used to torque a tooth in a sagittal plane or a frontal plane of the tooth through bending moments applied to the spacer 373. Rotation about any oblique axis passing through the spacer 373 can also be facilitated.

Figure 7A:
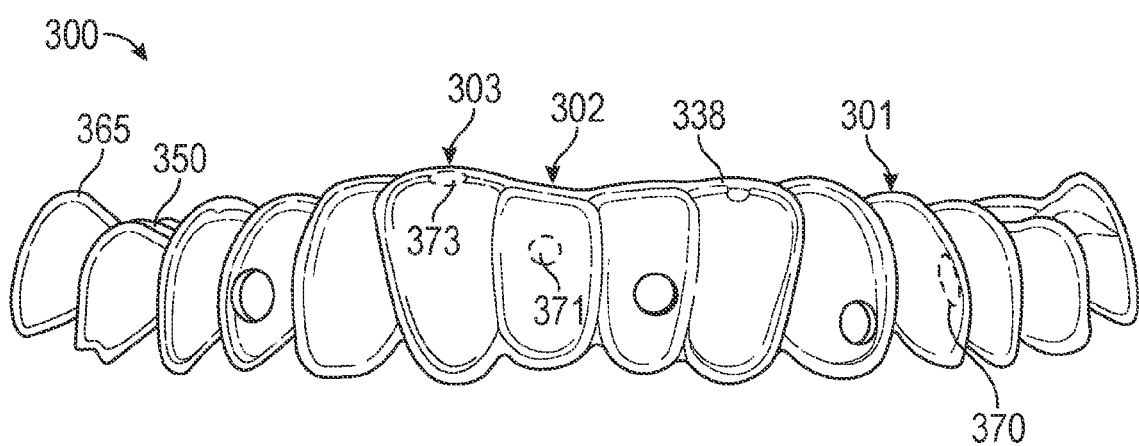
FIG. 7A illustrates a facial view of a dental appliance for a mandibular arch, wherein the posterior teeth are covered by adjoining tooth shells, and the arch member comprises a tray covering the facial, occlusal, and lingual surfaces of the anterior tooth shells, plus the bicuspid tooth shells.
Figure 7B:
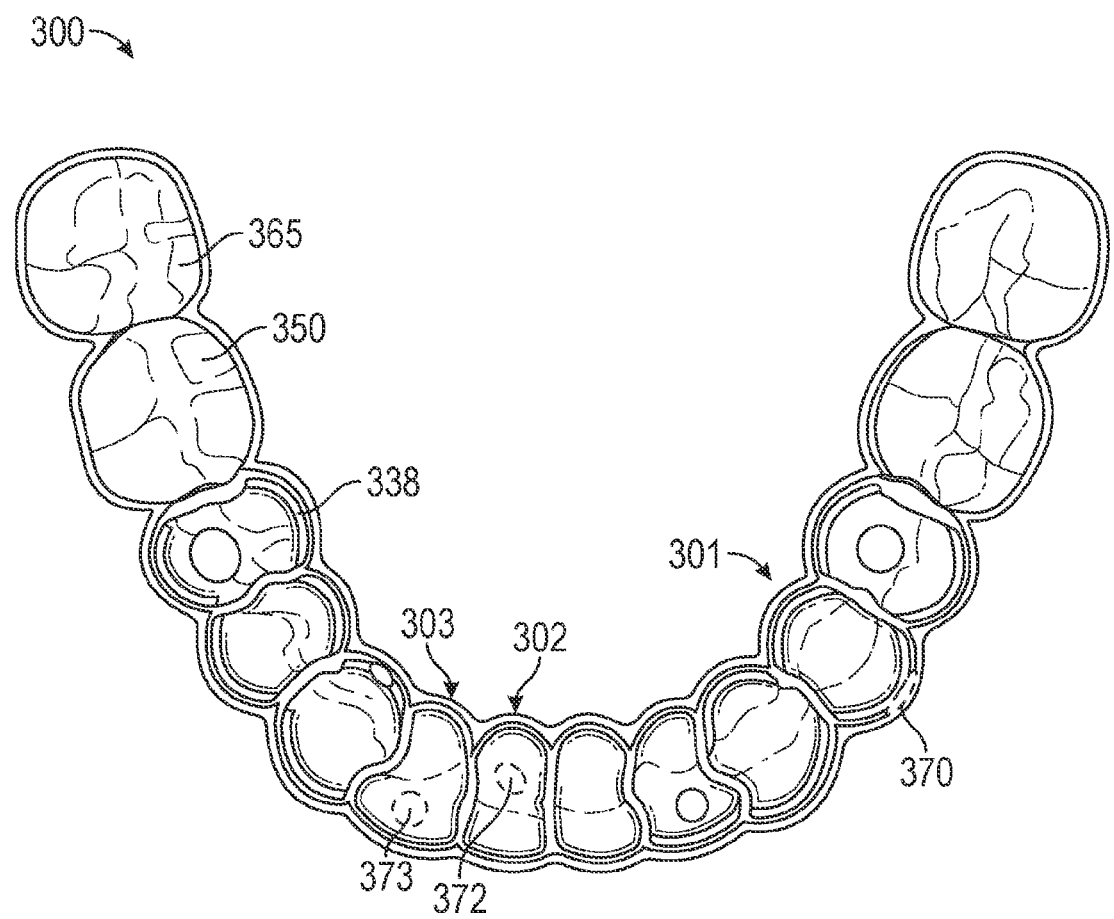
FIG. 7B illustrates an occlusal view of the dental appliance shown in 7A.

FIG. 7B shows the polymeric shell portion with at least one cavity for a first molar 350 and a second molar 365, wherein the polymeric shell portion for the first molar 350 and the second molar 365 are fused together. For example, the polymeric shell portion can have a first cavity that corresponds to the first and second molars (e.g., 350, 365) and a plurality of second cavities that corresponds to the various cusps of the first and second molars. The polymeric shell portion for the first and second molars represent somewhat fixed teeth that do not move relative to one another. In this example, the molars are connected directly to the over tray/arch member 338 to provide anchorage for the other tooth shells to lever against.

Figure 8:
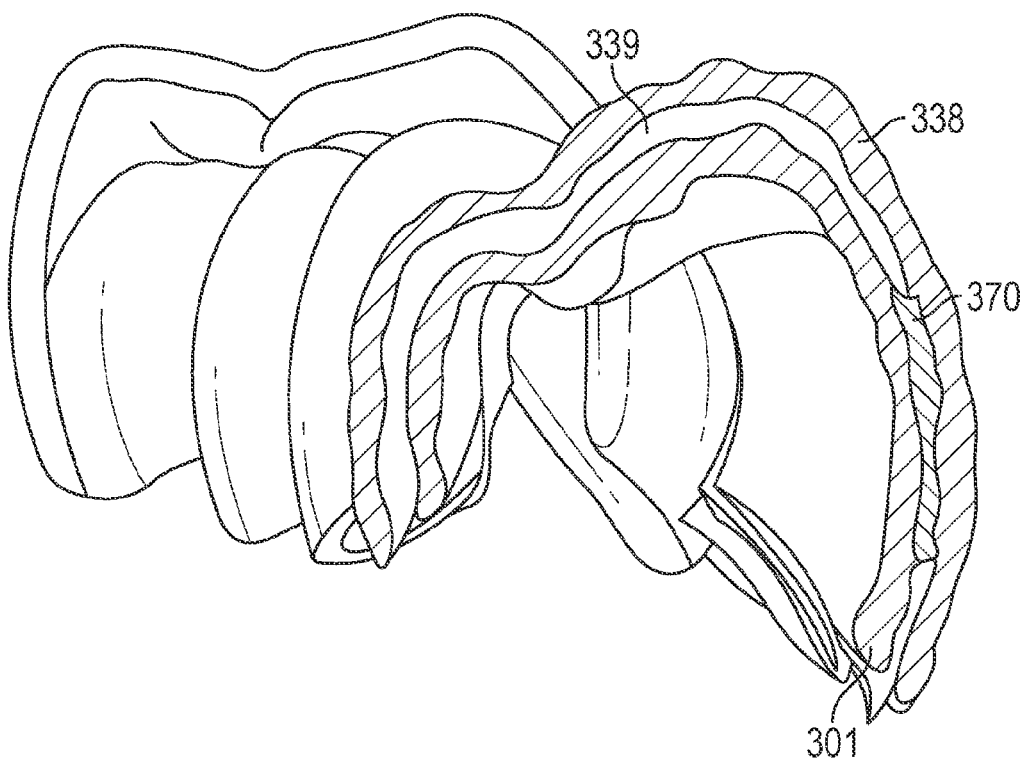
FIG. 8 illustrates a sagittal cross-section view of a polymeric shell portion of the dental appliance shown in FIG. 7A corresponding to a mandibular second molar.

In FIG. 8, the arch member 338 overlaps at least 100 percent of the surface area of the polymeric shell portion 301. As shown, a gap 339 is formed from the unfilled portion of the arch member 338 and the polymeric shell portion 301. The spacer 370 can maintain the gap 339 and provide positioning forces for a bicuspid tooth. The gap 339 can resist collapsing through positioning of spacers on adjacent polymeric shell portions (not shown). For example, an occlusal spacer on an adjacent polymeric shell portion can maintain the gap 339.

Figure 9:
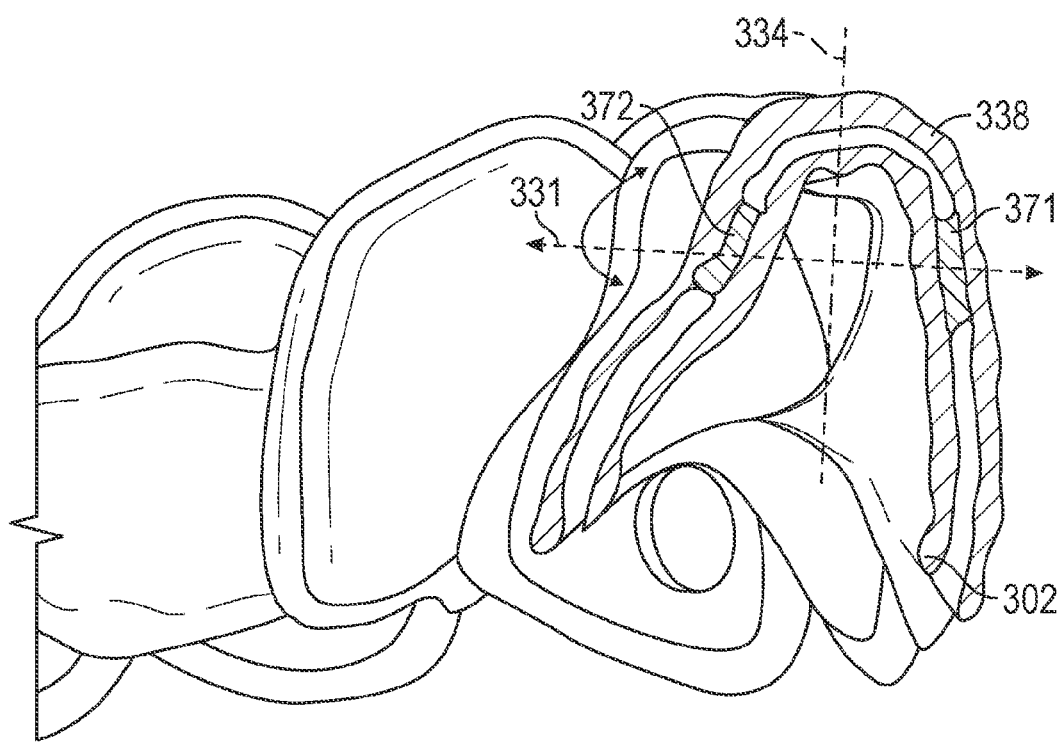
FIG. 9 illustrates a sagittal cross-section view of a polymeric shell portion of the dental appliance shown in FIG. 7A corresponding to a mandibular central incisor.

In FIG. 9, the arch member overlays at least 100 percent of the surface area of the polymeric shell portion 302. The polymeric shell portion 302 has two spacers, 371 and 372 that are coupled to the arch member 338. The axis of rotation 331 can form, because spacer 371 is displaced from spacer 372 by a distance through the tooth. Thus, the incisor tooth can be torqued about axis 331, thereby achieving crown movement in a frontal plane of the tooth.

Rotation about either spacer 371 or spacer 372 alone is possible without the other spacer. Although, by having both spacers disposed on either side of the polymeric shell portion, the rotation is fully constrained to an axis 331 that passes through both spacers 372 and 371. This provides for greater control over tooth rotations.

Rotation about other axes, such as vertical axis 334, is also possible. For example, if spacers 371 and 372 are placed in shear along generally vertical planes, where opposing force vectors are in mesial and distal directions, a couple is formed that results in torque about vertical axis 334. A similar configuration can also result in torque about a mesio-distal axis by placing spacers 371 and 372 in shear along vertically opposed force vectors.

Figure 10:
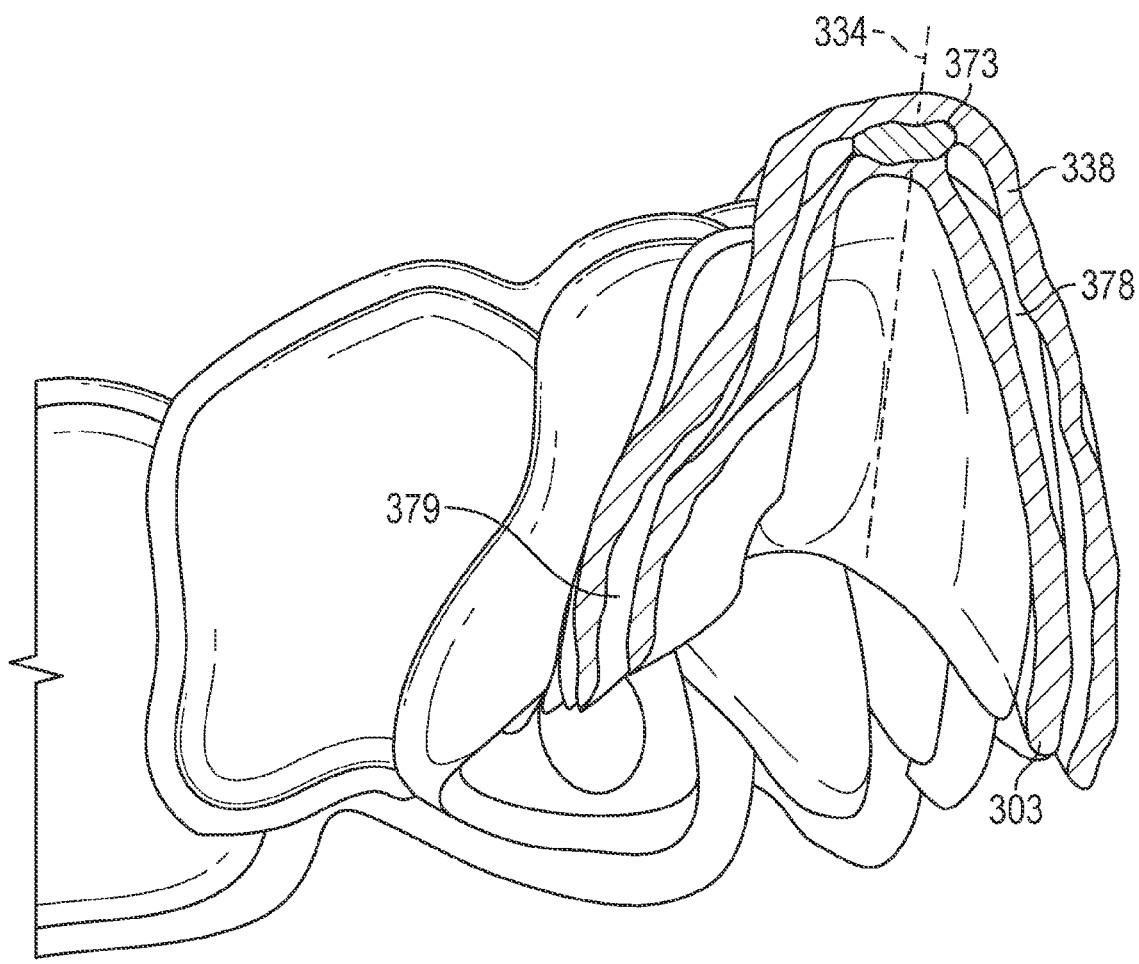
FIG. 10 illustrates a sagittal cross-section view of a polymeric shell portion of the dental appliance shown in FIG. 7A corresponding to a mandibular lateral incisor.
Figure 11A:
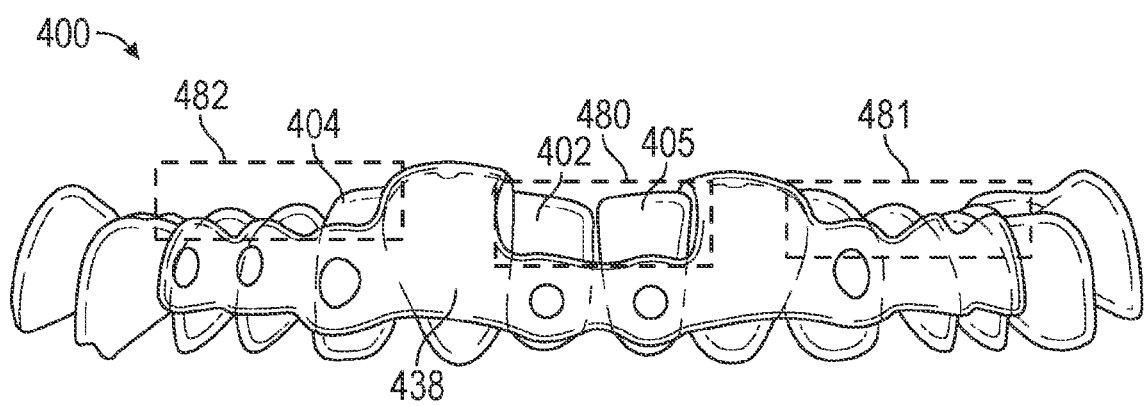
FIG. 11A illustrates a facial view of a dental appliance for a mandibular arch exposing at least some of the occlusal surfaces of the tooth shells.
Figure 11B:
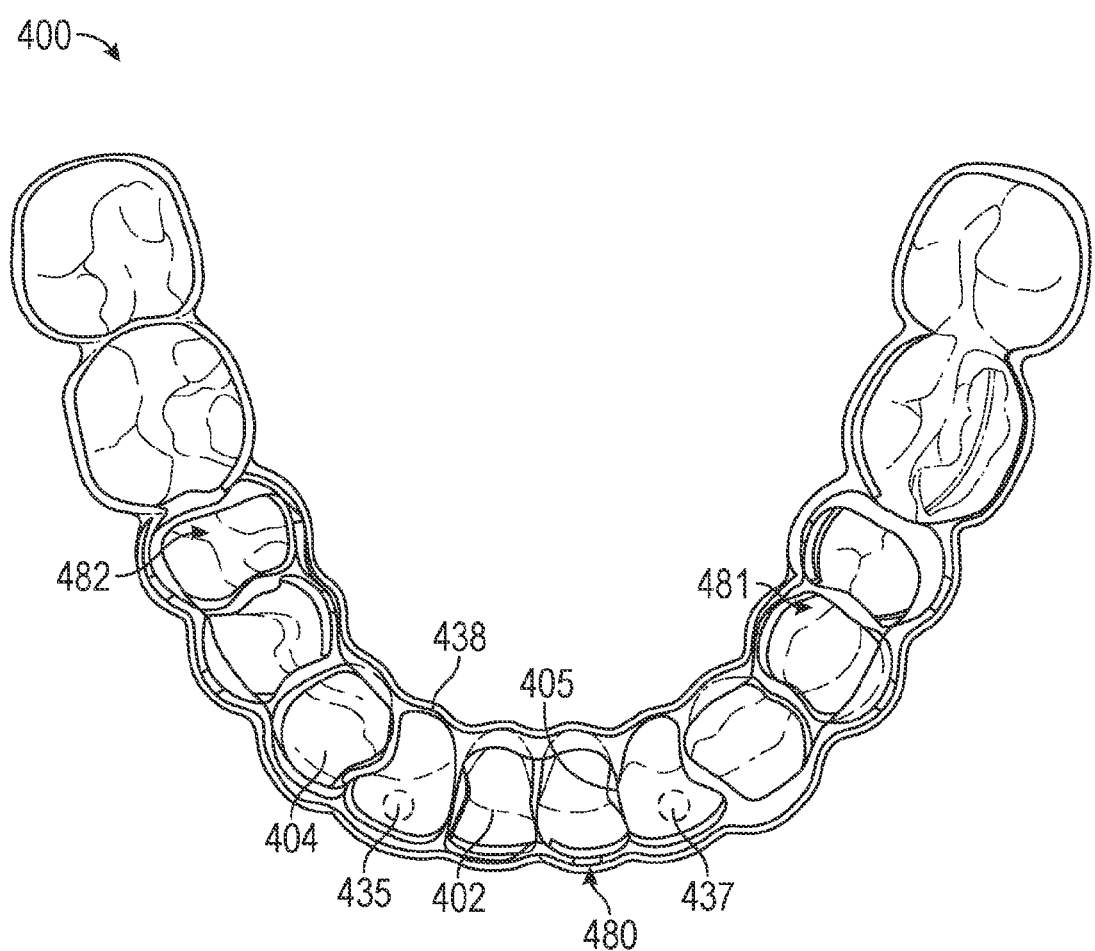
FIG. 11B illustrates an occlusal view of the dental appliance shown in FIG. 11A.
Figure 11C:
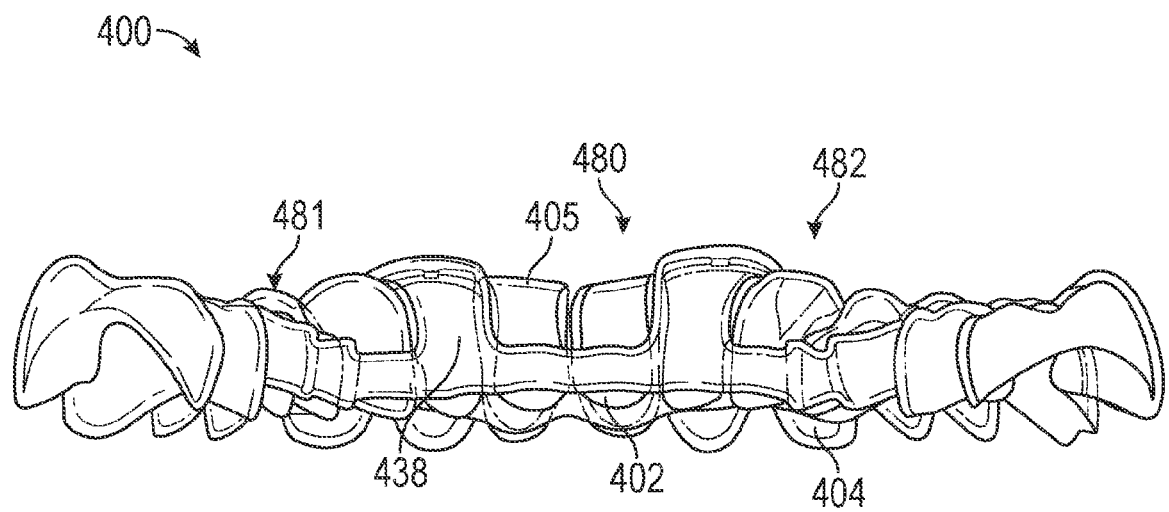
FIG. 11C illustrates a lingual view of the dental appliance shown in FIG. 11C.
Figure 11D:
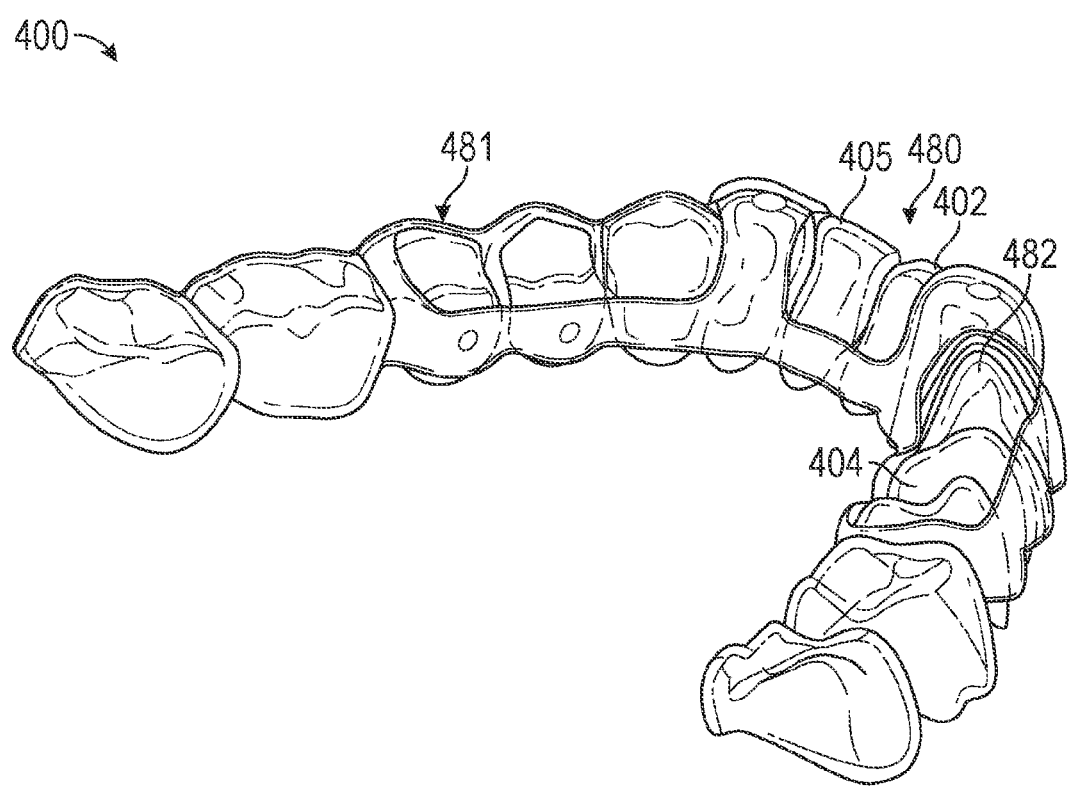
FIG. 11D illustrates an oblique occlusal/lingual/right-lateral view of the dental appliance shown in FIG. 11C.

In FIG. 10, the arch member 338 overlays at least 100 percent of the surface area of the polymeric shell portion 303. The polymeric shell portion 303 can have one spacer 373 located on the portion corresponding to the occlusal surface (or incisal edge) of the lateral incisor. The spacer 373 can provide gaps 378 and 379 formed between arch member 338 and polymeric shell portion 303. The gap 378 corresponds to an area between the polymeric shell portion corresponding to the labial surfaces of a tooth and the arch member 338. The gap 379 corresponds to an area between the polymeric shell portion corresponding to the lingual surface of a tooth and the arch member 338. The vertical axis 334 shown in FIG. 10 can represent an axis of rotation. As a result, spacer 373 would be in torsion.

In FIGS. 11A-11D, the dental appliance 400 can be similar to the dental appliance 300 in FIGS. 7A-7B, except that the arch member 438 has a cut out portion formed therewith. The cut out portion can be formed from the arch member 438. The cut out portion can reduce the amount of material needed in the dental appliance 400, reduce bulk, allow for better intercuspation, and selectively allow repositioning of teeth. A polymeric shell portion may be present on fixed teeth to aid in securement of the dental appliance.

As an illustrative example, the dental appliance 400 has three cut out portions: cut out portion 480, cut out portion 481, and cut out portion 482. Each cut out portion can be formed from the arch member 438 and expose at least a portion of a surface (e.g., an occlusal surface) of a polymeric shell portion. For example, cut out portion 480 exposes a portion of polymeric shell portion 405 and a portion of polymeric shell portion 402. Cut out portion 481 exposes at least some occlusal surfaces of at least two polymeric shell portions. Cut out portion 482 exposes at least some occlusal surfaces of at least two polymeric shell portions, including polymeric shell portion 404.

For the illustrative example in dental appliance 400, the occlusal surfaces of the polymeric shell portion 405 is exposed by removing unneeded portions of the arch member 438. The arch member 438 is present on the lateral incisors, because those teeth have prescribed 1/ order rotations (about the tooth's long axis), and a spacer 435 or 437 is needed on the incisal edge of each of those teeth. The portion of arch member 438 supports the spacers 435 or 437.

The edges of the cut out portion can be reinforced with a built-out portion or flange (not shown). Although dental appliance 400 is shown with the arch member 438 overlapping sides of the polymeric shell portions corresponding to both lingual and facial surfaces of the teeth, the arch member 438 can also be on a side corresponding to an occlusal surface of the teeth.

Figure 12:
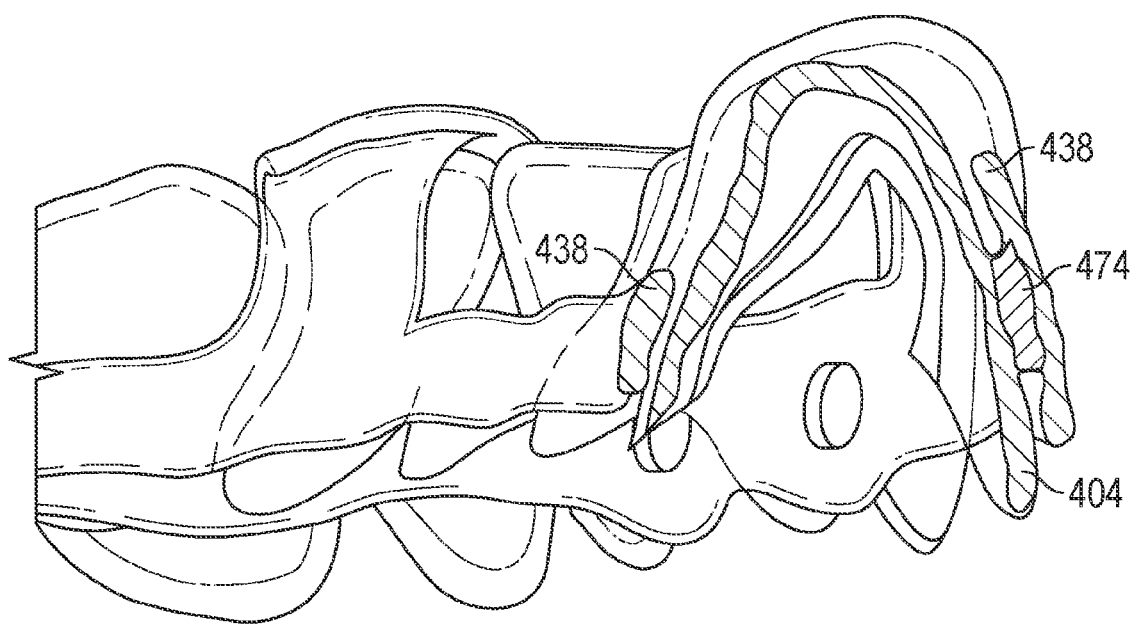
FIG. 12 illustrates a sagittal cross-section view of a polymeric shell portion of the dental appliance shown in FIG. 11A corresponding to a mandibular cuspid.

In FIG. 12, the polymeric shell portion 404 is shown. The polymeric shell portion 404 can be exposed through the cut out portion 482 of the arch member 438. In some embodiments, the arch member 438 is coupled to spacer 474, which is further coupled to the polymeric shell portion 404. A portion of the arch member 438 can be uncoupled from the side of the polymeric shell portion 404 corresponding to the oral surface of the tooth. The uncoupled side can couple to an adjacent polymeric shell portion to provide repositioning forces for a tooth or be allowed to float and not produce a definite axis of rotation for the tooth.

In some embodiments, the dental appliance 400 can also have a second arch member (not shown) that can be separate from the first arch member. For example, a second arch member can couple to a spacer that is coupled to a side of the dental appliance 400 corresponding to the lingual surface of a tooth, while the first arch member is coupled to a side of the dental appliance 400 corresponding to a facial surface of a tooth.

Figure 13A:
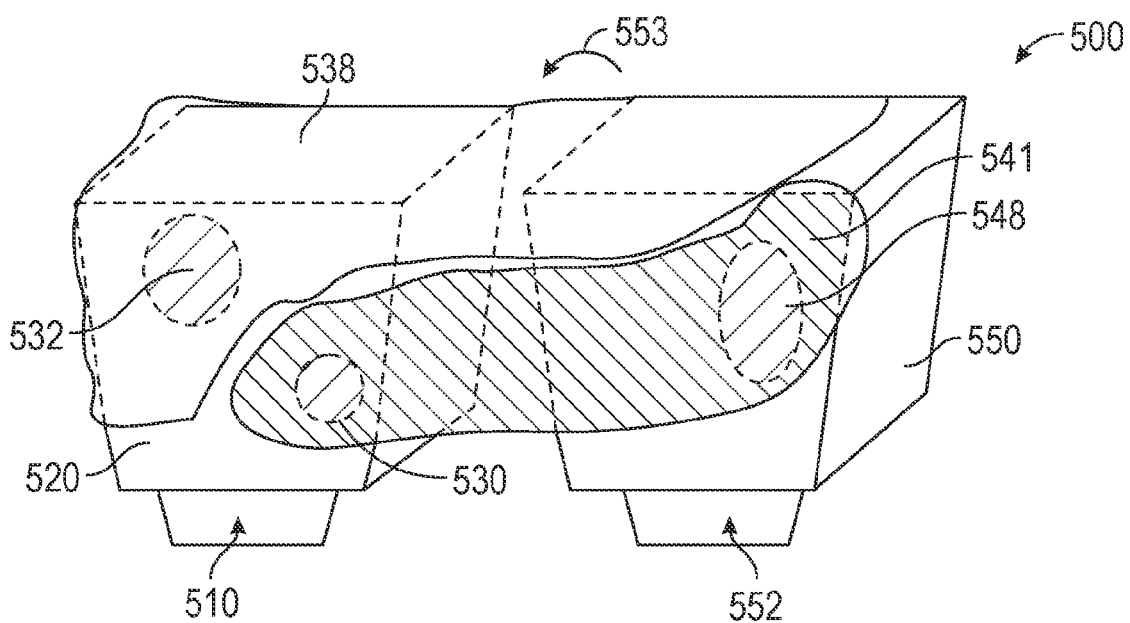
FIG. 13A illustrates a facial view of a dental appliance.
Figure 13B:
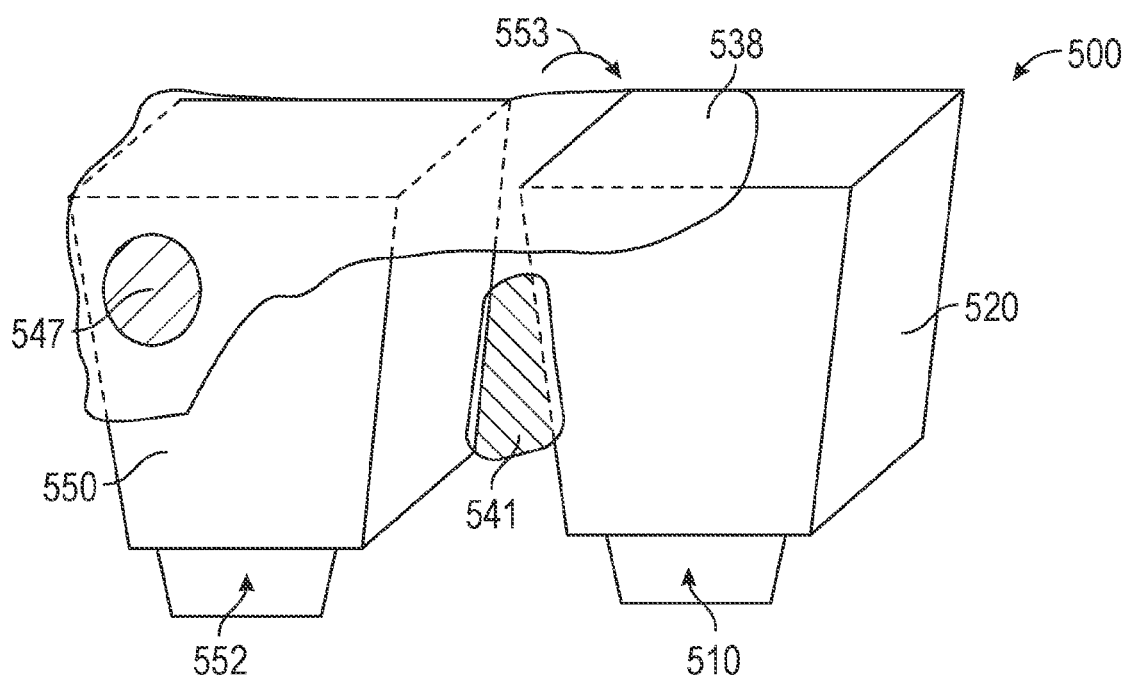
FIG. 13B illustrates a lingual view of a dental appliance.

In FIGS. 13A-B, a schematic diagram (not to scale) of a dental structure including a dental appliance 500 with a first arch member 538 and a second arch member 541 is shown. The dental structure can include tooth 510, and tooth 552. Components of the dental appliance 500 can be similar to those on dental appliance 100 and dental appliance 200 from FIGS. 2A-E.

A first polymeric shell portion 520 can be removably coupled to tooth 510, while the second polymeric shell portion 550 can be removably coupled to tooth 552. Each polymeric shell portion can be secured to the tooth such that the polymeric shell portion does not move rotationally with respect to the tooth.

The first arch member 538 can couple to the first polymeric shell portion 520 through spacer 532 on the surface corresponding to the facial surface of a tooth. The first arch member 538 can couple to the second polymeric shell portion 550 through spacer 547 on the surface corresponding to the lingual surface of a tooth (see FIG. 13B). The first arch member 538 can both pull tooth 552 toward tooth 510 in the mesial direction as shown in 553 and tip the occlusal end of tooth 552 facially. In some embodiments, other movements such as translations and rotations can be facilitated by the configuration of the arch member 538.

The second arch member 541 can couple to the first polymeric shell portion 520 and second polymeric shell portion 550 through spacer 530 and spacer 548, respectively, on the facial side. The second arch member 541 can have a length that causes tension between spacers 530 and 548, such that the tooth 552 is translated toward tooth 510.

In the embodiment of FIGS. 13A and 13B, tension is provided between the teeth. In some embodiments, the appliance 500 can be an incremental appliance which uses a series of different appliances to cause incremental desired movements.

As described herein, a practitioner can prescribe a series of different appliances. Each dental appliance may prescribe an incremental dentition state. The patient can attach a first dental appliance corresponding to a first dentition state to the teeth. The first dental appliance can optionally be further attached with bonding compound. Once a dentition state is achieved, then a second dental appliance can be applied, corresponding to a second dentition state of the teeth.

Aspects of the present disclosure can also relate to a non-transitory computer readable medium. As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIGS. 14-18 illustrate the treatment planning and digital design of various aspects of shell portions disclosed herein.

Figure 14:
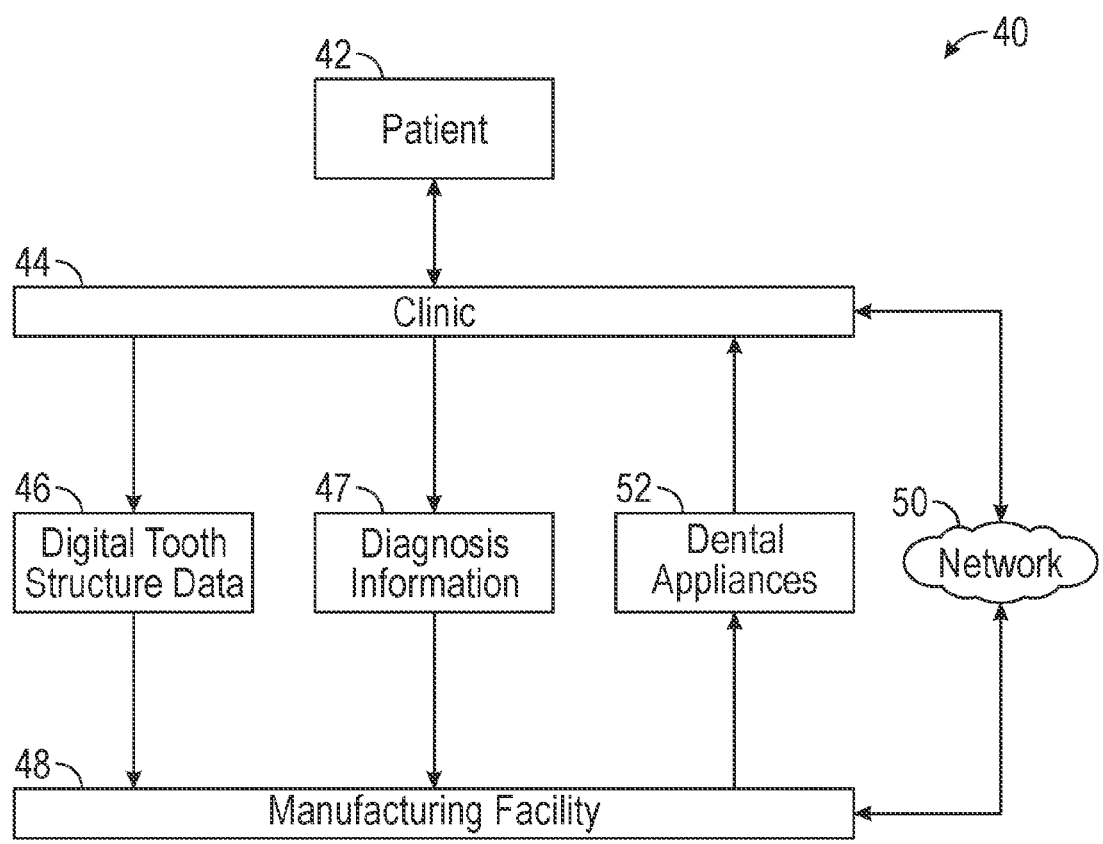
FIG. 14 is a block diagram illustrating an example computer environment in which a clinic and manufacturing facility communicate information throughout a dental appliance manufacturing process.

FIG. 14 is a block diagram illustrating an example computer environment 40 in which clinic 44 and manufacturing facility 48 communicate information throughout a manufacturing process of a set of removable dental appliances 52 for patient 42. Initially, an orthodontic practitioner of clinic 44 generates one or more images of a dental structure of patient 42 using any suitable imaging technique and generates digital dental structure data 46 (e.g., a digital representation of patient's 42 tooth structure). For example, the practitioner may generate X-ray images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of 3D data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.). Alternatively, other intra-oral scanners or intra-oral contact probes may be used. As another option, the digital structure data 46 may be provided by scanning a negative impression of the patient's teeth. As still another option, the digital structure data 46 may be provided by imaging a positive physical model of the patient's teeth or by using a contact probe on a model of the patient's teeth. The model used for scanning may be made, for example, by casting an impression of a patient's dentition from a suitable impression material, such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.).

In addition to providing digital images by scanning the exposed surfaces of the teeth, it is possible to image hidden features of the dentition, such as the roots of the patient's teeth and the patient's jaw bones. In some embodiments, the digital tooth structure data is formed by providing several three-dimensional (3D) images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), and U.S. Patent Publication No. 2004/0029068 (Badura et al.), Issued U.S. Pat. No. 7,027,642 (Imgrund et al.), and U.S. Pat. No. 7,234,937 (Sachdeva, et al.) describe using techniques of integrating digital images provided from various 3D sources. Accordingly, the term "imaging" as it is used herein is not limited to normal photographic imaging of visually apparent structures, but includes imaging of dental structures that are hidden from view. The dental structure may include, but is not limited to, any portion of crowns and/or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

In order to generate digital tooth structure data 46, a computer transforms raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. In order for this data to be useful in orthodontic diagnosis and treatment, the computer may "segment" dentition surfaces to produce one or more discrete, movable 3D tooth object models representing individual teeth. The computer may further separate these tooth models from the gingiva into separate objects. Segmentation allows a user to characterize and manipulate the teeth arrangement as a set of individual objects. Advantageously, the computer may derive diagnostic information such as arch length, bite setting, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental structure data 46, clinic 44 may store digital dental structure data 46 within a patient record in a database. Clinic 44 may, for example, update a local database having a plurality of patient records. Alternatively, clinic 44 may remotely update a central database (optionally within manufacturing facility 48) via network 50. After digital tooth structure data 46 is stored, clinic 44 electronically communicates digital dental structure data 46 to manufacturing facility 48. Alternatively, manufacturing facility 48 may retrieve digital dental structure data 46 from the central database. Clinic 44 may also forward prescription data 47 conveying general information regarding a practitioner's diagnosis and treatment plan for patient 42 to manufacturing facility 48. In some examples, prescription data 47 may be more specific. For example, digital dental structure data 46 may be a digital representation of the dental structure of patient 42, and the practitioner of clinic 44 may review the digital representation and indicate desired movement, spacing or final positions of individual teeth of patient 42 following treatment with the set of removable dental appliances 52 prior to forwarding digital dental structure data 46 to manufacturing facility 48. Manufacturing facility 48 may be located off-site, or located with clinic 44.

For example, each clinic 44 may include its own equipment for manufacturing facility 48 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental structure of patient 42 through additive manufacturing. The 3D printer may use iterative digital designs of the original dental structure of patient 42, as well as a desired dental structure of patient 42, to produce multiple digital appliances and/or digital appliance patterns customized to produce the desired dental structure of patient 42. Manufacturing may include post-processing to remove uncured resin and support structures, or to assemble various components, which may also be necessary and could also be performed in a clinical setting.

Manufacturing facility 48 utilizes digital dental structure data 46 of patient 42 to construct the set of removable dental appliances 52 in order to reposition teeth of patient 42. Sometime thereafter, manufacturing facility 48 forwards the set of removable dental appliances 52 to clinic 44 or, alternatively, directly to patient 42. For example, the set of removable dental appliances 52 may be an ordered set of removable dental appliances. Patient 42 then wears the removable dental appliances in the set of removable dental appliances 52 sequentially over time according to a prescribed schedule in order to reposition the teeth of patient 42. For example, patient 42 may wear each removable dental appliance in the set of removable dental appliances 52 for a period of between about 1 week and about 12 weeks, such as between about 3 weeks and about 10 weeks or between about 4 weeks and about 8 weeks. Optionally, patient 42 may return to clinic 44 for periodic monitoring of the progress of the treatment with removable dental appliances 52.

During such periodic monitoring, a clinician may adjust the prescribed schedule of patient 42 for wearing the removable dental appliances in the set of removable dental appliances 52 sequentially over time. Monitoring generally includes visual inspection of the teeth of patient 42 and may also include imaging to generate digital tooth structure data. In some relatively uncommon circumstances, the clinician may decide to interrupt the treatment of patient 42 with the set of removable dental appliances 52, for example, by sending the newly generated digital dental structure data to manufacturing facility 48 in order to produce a new set of removable dental appliances. In the same or different examples, the clinician may send newly generated digital dental structure data to manufacturing facility 48 following the completion of the prescribed schedule of the treatment with removable dental appliances 52. In addition, following the completion of the prescribed schedule of the treatment with removable dental appliances 52, the clinician may request a new set of removable dental appliances from manufacturing facility 48 to continue treatment of patient 42.

Figure 15:
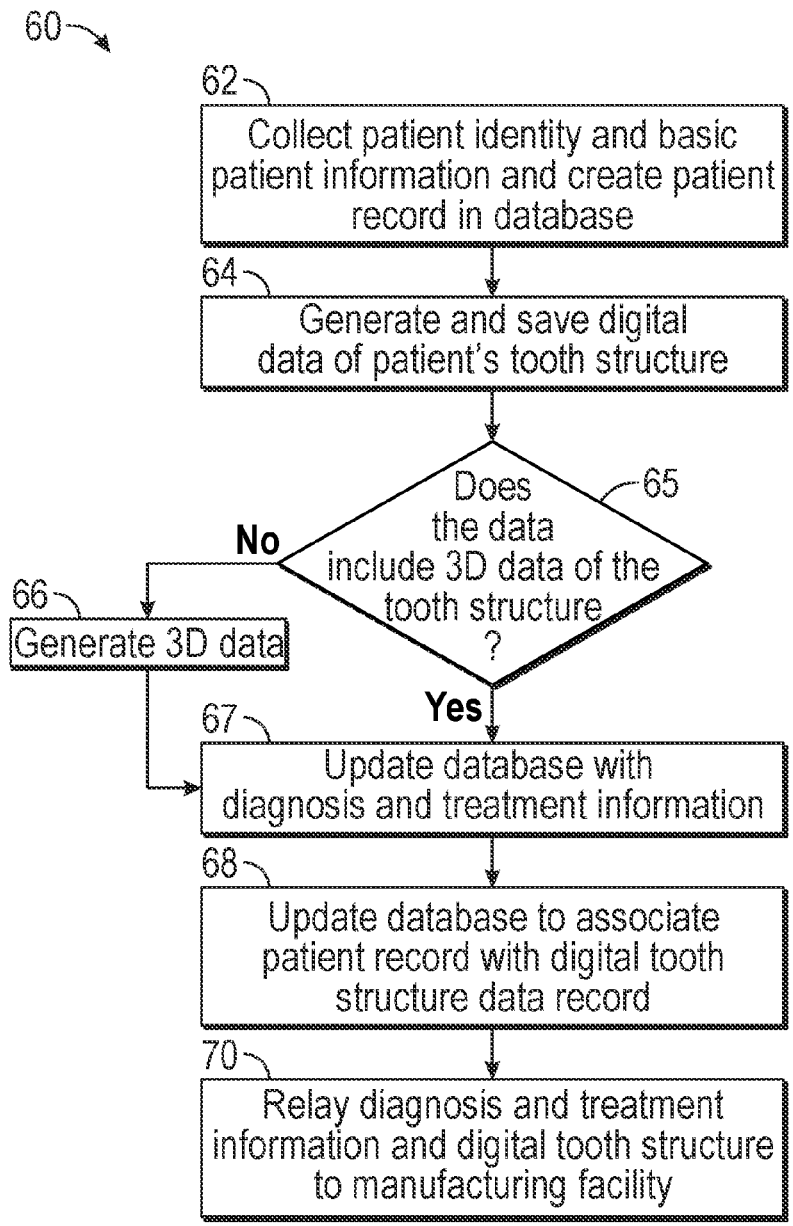
FIG. 15 is a flow diagram illustrating a process conducted at the clinic in accordance with one example of this disclosure.

FIG. 15 is a flow diagram illustrating process 60 conducted at clinic 44 in accordance with one example of this disclosure. In block 62, a practitioner at clinic 44 collects patient identity and other information from patient 42 and creates a patient record. As described, the patient record may be located within clinic 44 and optionally configured to share data with a database within manufacturing facility 48. Alternatively, the patient record may be located within a database at manufacturing facility 48 that is remotely accessible to clinic 44 via network 50 or within a database that is remotely accessible by both manufacturing facility 48 and clinic 44.

In block 64, digital data 46 of the dental structure of patient 42 may be generated and saved using any suitable technique to thereby create a virtual dental structure. Digital data 46 may be comprised of a two-dimensional (2D) image and/or a three-dimensional (3D) representation of the dental structure.

In one example, 3D representations of a dental structure are generated using a cone beam computerized tomography (CBCT) scanner, such as an i-CAT 3D dental imaging device, which is available from Imaging Sciences International, LLC; 1910 N Penn Road, Hatfield, Pa. Clinic 44 stores the 3D data 46 (in the form of radiological images) generated from the CBCT scanner in the database located within clinic 44, or alternatively, within manufacturing facility 48. The computing system processes the digital data 46 from the CBCT scanner, which may be in the form of a plurality of slices, to compute a digital representation of the tooth structure that may be manipulated within the 3D modeling environment.

In block 65, the computing system can determine whether the data includes 3D data of the tooth structure. If not, the practitioner may further generate 3D digital data in block 66. The 3D data 46 may be produced by, for example, forming and subsequently digitally scanning a physical impression or casting of the tooth structure of patient 42. For example, a physical impression or casting of a dental arch of patient 42 may be scanned using a visible light scanner, such as an OM-3R scanner available from Laser Design, Inc. of Minneapolis, Minn. Alternatively, the practitioner may generate the 3D data 46 of the occlusal service by use of an intra-oral scan of the dental arch of patient 42, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, may be used. In the same or different examples, techniques for defining a virtual tooth surface and virtual tooth coordinate system as described in U.S. Pat. No. 8,897,902, titled ORTHODONTIC DIGITAL SETUPS," and published on Dec. 5, 2013 may be used. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the tooth structure of patient 42 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low resolution image of the roots obtained from a CBCT scanner (e.g., an i-CAT 3D dental imaging device) and the second 3D digital representation may be a relatively high resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software, available from 3D Systems, Inc.; 333 Three D Systems Circle, Rock Hill, S.C.), or alternatively, registration techniques described in U.S. Pat. No. 8,491,306 may be used.

If the data includes 3D data of the tooth structure in block 65, then the process 60 can continue to block 67. In block 67, a computer system can update the database with diagnosis and treatment information. A computer system executing 3D modeling software renders a resultant digital representation of the tooth structure, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the desired final positions or the teeth of patient 42. In block 68, a database is updated to associate patient records with the digital tooth structure data records. For example, once the practitioner has finished conveying general information regarding a diagnosis and treatment plan within the 3D environment, the computer system updates the database associated with the patient record to record the prescription data 47 conveying general information regarding a diagnosis and treatment plan as specified by the practitioner.

In block 69, the prescription data 47 (e.g., the diagnosis and treatment information and digital tooth structure) is relayed to manufacturing facility 48 in order for manufacturing facility 48 to construct one or more removable dental appliances, such as removable dental appliances 52.

Although described with respect to an orthodontic practitioner located at an orthodontic clinic, one or more of the steps discussed with respect to process 60 may be performed by a remote user, such as a user located at manufacturing facility 48. For example, the orthodontic practitioner may only send radiological image data and an impression or casting of the patient to manufacturing facility 48, where a user interacts with a computer system to develop a treatment plan within a 3D modeling environment.

Optionally, a digital representation of the treatment plan within the 3D modeling environment may then be transmitted to the orthodontic practitioner of clinic 44, who may review the treatment plan and either send back his or her approval, or indicate desired changes.

Figure 16:
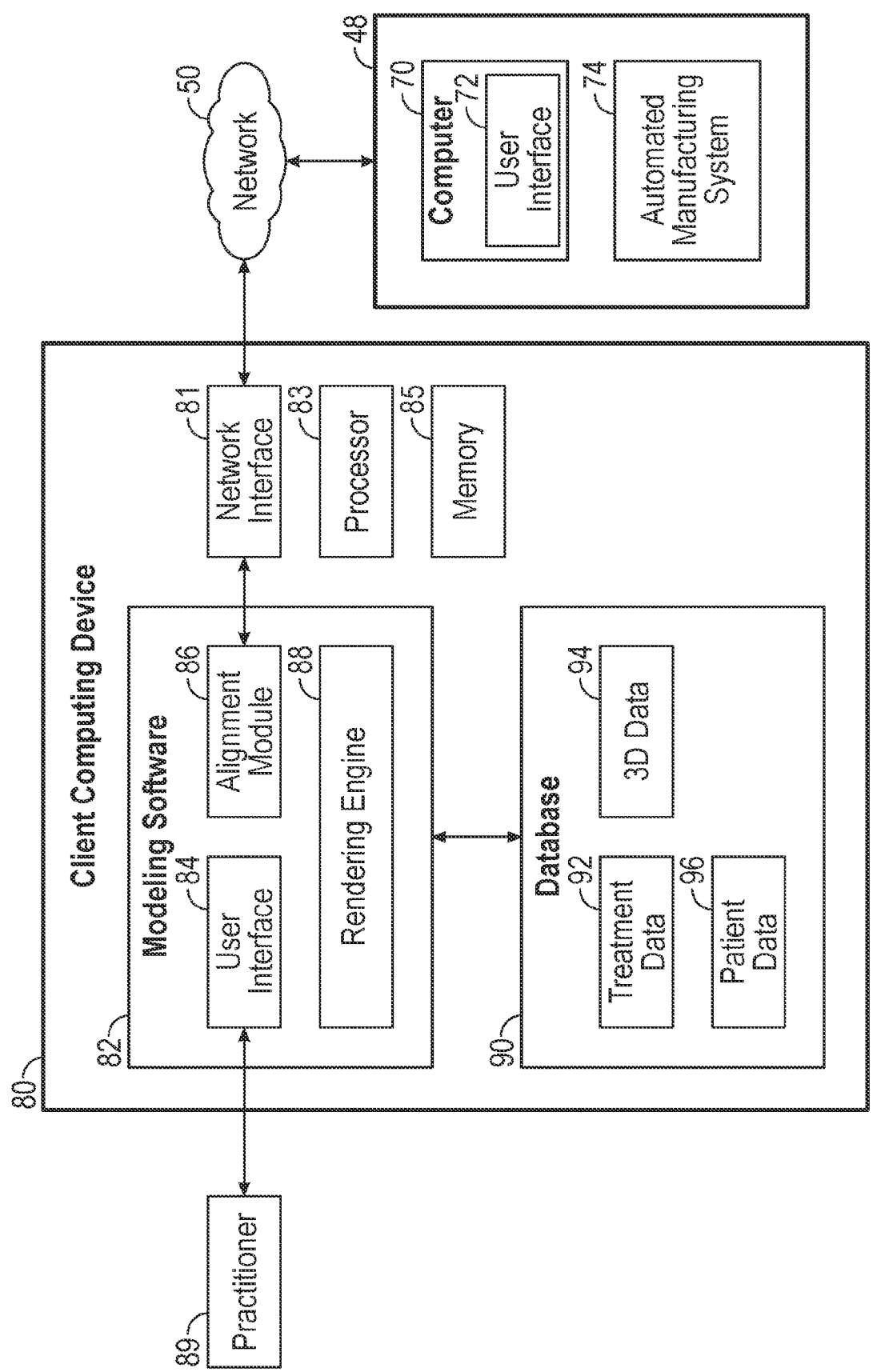
FIG. 16 is a block diagram illustrating an example of a client computing device connected to a manufacturing facility via a network.

FIG. 16 is a block diagram illustrating an example of a client computing device 80 connected to manufacturing facility 48 via network 50. In the illustrated example, client computing device 80 provides an operating environment for modeling software 82. Modeling software 82 presents a modeling environment for modeling and depicting the 3D representation of the teeth of patient 42. In the illustrated example, modeling software 82 includes user interface 84, alignment module 86, and rendering engine 88.

User interface 84 provides a graphical user interface (GUI) that visually displays the 3D representation of patient's 42 teeth. In addition, user interface 84 provides an interface for receiving input from practitioner 89 of clinic 44 (FIG. 10), e.g., via a keyboard and a pointing device, for manipulating patient's 42 teeth within the modeled dental arch.

Modeling software 82 may be accessible to manufacturing facility 48 via network interface 81. Modeling software 82 interacts with database 90 to access a variety of data, such as treatment data 92, 3D data 94 relating to the tooth structure of patient 42, and patient data 96. Database 90 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computing device 80, database 90 may be located remote from the client computing device and coupled to the client computing device via a public or private network, e.g., network 50. Treatment data 92 describes a diagnosis and/or repositioning information of the teeth of patient 42 selected by practitioner 89 and positioned within the 3D modeling environment. Patient data 96 describes a set of one or more patients, e.g., patient 42, associated with practitioner 89. For example, patient data 96 specifies general information, such as a name, date of birth, and a dental history, for each patient.

Rendering engine 88 accesses and renders 3D data 94 to generate the 3D view presented to practitioner 89 by user interface 84. More specifically, 3D data 94 includes information defining the 3D objects that represent each tooth (optionally including roots), and jaw bone within the 3D environment. Rendering engine 88 processes each object to render a 3D triangular mesh based on viewing perspective of practitioner 89 within the 3D environment. User interface 84 displays the rendered 3D triangular mesh to practitioner 89, and allows practitioner 89 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein.

Client computing device 80 includes processor 83 and memory 85 in order to store and execute modeling software 82. Memory 85 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media. Processor 83 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 85 may store program instructions (e.g., software instructions) that are executed by processor 83 to carry out the techniques described herein. In other examples, the techniques may be executed by specifically programmed circuitry of processor 83. In these or other ways, processor 83 may be configured to execute the techniques described herein.

Client computing device 80 is configured to send a digital representation of a 3D tooth structure of a patient, and optionally, treatment data 92 and/or patient data 96 to computer 70 of manufacturing facility 48 via network 50. Computer 70 includes user interface 72. User interface 72 provides a GUI that visually displays the 3D representation of the digital model of teeth. In addition, user interface 72 provides an interface for receiving input from a user, e.g., via a keyboard and a pointing device, for manipulating a patient's teeth within the digital representation of the 3D tooth structure of the patient.

Computer 70 may further be configured to determine dimensions and shapes of a set of removable dental appliances for the patient, the dimensions and shapes of the removable dental appliance being configured to reposition the one or more teeth of the patient from their initial positions to adjusted positions when the removable dental appliances are worn by the patient. Computer 70 may provide the dimensions and shapes of the set of removable dental appliances for the patient to automated manufacturing system 74 for production of the set of removable dental appliances.

Client computing device 80 and computer 70 are merely conceptual representations of an example computer system. In some examples, the functionalities described with respect to those of client computing device 80 and/or computer 70 may be combined into a single computing device or distributed among multiple computing devices within a computer system. For example, cloud computing may be used for digital design of dental appliances described herein. In one example, the digital representations of tooth structures are received at one computer at the clinic, while a different computer, such as computer 70, is used to determine the shapes and dimensions of a dental appliance. In addition, it may not be necessary for that different computer, such as computer 70, to receive all of the same data in order for it determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 80 and computer 70, or otherwise utilized to design a custom dental appliance may be significantly less than the complete data set representing a complete digital dental model of a patient.

Figure 17:
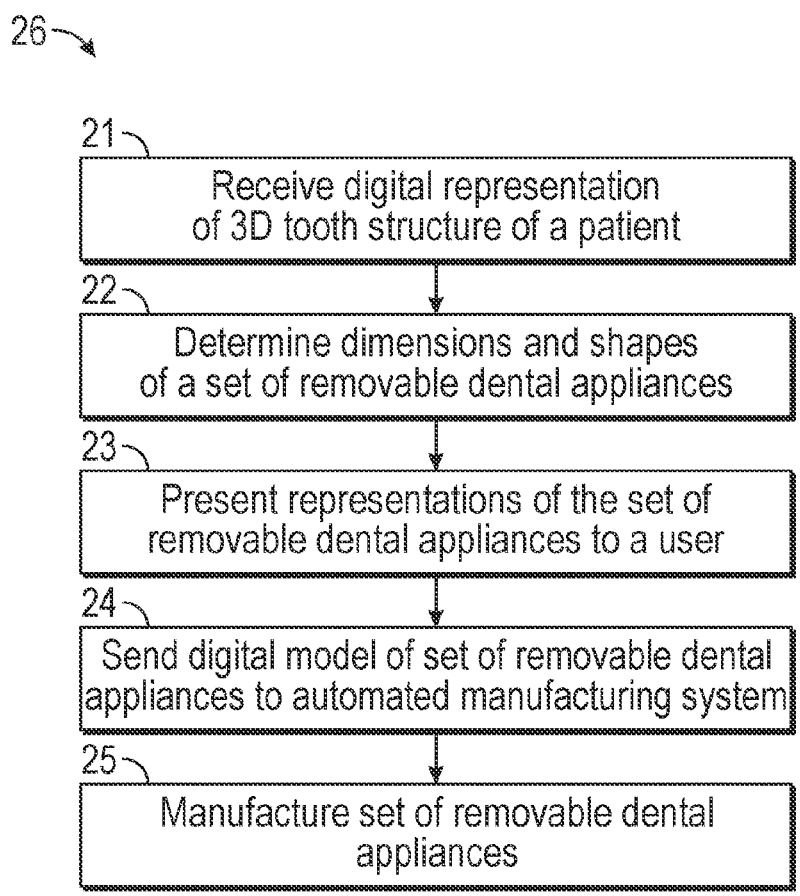
FIG. 17 is a flow diagram illustrating a process conducted at a manufacturing facility for construction of a set of removable dental appliances.

FIG. 17 is a flow diagram illustrating process 26 conducted at manufacturing facility 48 for construction of removable dental appliances 52. In some examples, removable dental appliances 52 may include one or more of removable dental appliances such as those discussed herein. In block 21, a computer 70 at manufacturing facility 48 receives digital tooth structure data 46 from patient 42 via clinic 44, thus providing initial positions of one or more teeth of the patient, and prescription data 47 from clinic 44. Alternatively, computer 70 retrieves the information from a database located within or otherwise accessible by computer 70. A trained user associated with computer 70 may interact with a computerized modeling environment running on computer 70 to develop a treatment plan relative to the digital representation of the patient's tooth structure and generate prescription data 47, if clinic 44 has not already done so. In other examples, computer 70 may automatically develop a treatment plan based solely on the patient's tooth structure and predefined design constraints.

In block 22, the computer 70 determines dimensions and shapes of a removable dental appliance for the patient. The dimensions and shapes of the removable dental appliance are configured to reposition the one or more teeth of the patient from their initial positions to adjusted positions when the removable dental appliance is worn by the patient. In the same or additional examples, computer 70 determines dimensions and shapes of a set of removable dental appliances for the patient, the set of removable dental appliances for the patient being configured to be worn in series.

In some examples, determining dimensions and shapes of the removable dental appliance includes selecting, with computer 70, the dimensions and shapes of the removable dental appliance according to a set of predefined design constraints. The set of predefined design constraints may include one or more factors, including, but not limited to, a maximum localized force applied to one or more of the surrounded teeth, a maximum rotational force applied to one or more of the surrounded teeth, a maximum translational force applied to one or more of the surrounded teeth, a maximum total force applied to one or more of the surrounded teeth, and a maximum strain applied to the removable dental appliance when worn by the patient when the surrounded teeth are in their initial positions.

Computer 70 may use Finite Element Analysis (FEA) techniques to analyze forces on a patient's teeth as well as the removable dental appliance during the determination of the dimensions and shapes of the removable dental appliance. For example, computer 70 may apply FEA to a solid model of the patient's teeth as the modeled teeth move from their initial positions to their final positions, representing a treatment including an ordered set of removable dental appliances. Computer 70 may use FEA techniques to select an appropriate removable dental appliance to apply the desired forces on the teeth. In addition, computer 70 may use a virtual articulator to determine contact points between the teeth throughout the movement of the modeled teeth during the treatment. Computer 70 may further include occlusal contact forces, such as interdigitation forces, in the FEA forces analysis in combination with forces from device during the design of removable dental appliances in an ordered set of removable dental appliances.

In the same or different examples, determining dimensions and shapes of the removable dental appliance includes selecting, with computer 70 thicknesses of the facial portion and the lingual portion of the dental appliance body in order to provide a stiffness suitable to reposition the one or more teeth of the patient from their initial positions to adjusted positions when the removable dental appliance is worn by the patient. In different examples, such selected thickness may range between about 0.25 millimeters and about 2.0 millimeters thick, such as between about 0.5 and about 1.0 millimeters thick. In some examples, computer 70 may further select a material of at least a portion of the removable dental appliance (e.g., the facial and lingual body portions) according to the predefined design constraints or to provide a desired stiffness characteristic without necessarily increasing the thickness.

In block 23, the dimensions and shapes of a removable dental appliance for the patient may be presented to a user via user interface 72 of computer 70. In examples in which dimensions and shapes of the removable dental appliance are presented to a user via user interface 72 of computer 70, the user may have the opportunity to adjust the design constraints or directly adjust the dimensions and shapes of the removable dental appliance before the design data is sent to automated manufacturing system.

In block 23, alternatively or additionally, the dimensions and shapes of a removable dental appliance for the patient may be presented to a user by computer 70 directly as the removable dental appliance manufactured by automated manufacturing system 74. In such examples, computer 70 sends a digital model of the removable dental appliance to automated manufacturing system 74, and automated manufacturing system 74 manufactures the removable dental appliance according to the digital model from computer 70.

In block 24, computer 70, following user approval, sends a digital model of the removable dental appliance to automated manufacturing system 74 (even in examples where the dimensions and shapes of a removable dental appliance for the patient may be presented to a user via user interface 72 of computer 70).

In block 25, an automated manufacturing system 74 manufactures the removable dental appliance according to the digital model from computer 70.

In some examples, automated manufacturing system 74 may include a 3D printer. The techniques of process 26 may be applied to the design and manufacture of each of an ordered set of removable dental appliances for the patient. For example, each removable dental appliance in the ordered set of removable dental appliances may be configured to incrementally reposition the teeth of the patient. In this manner, the ordered set of removable dental appliances may be configured to reposition the teeth of the patient to a greater degree than any one of the removable dental appliances within the set of the removable dental appliances. Such an ordered set of removable dental appliances for the patient may specifically be configured to incrementally reposition the one or more teeth of the patient from their initial positions to final adjusted positions as the removable dental appliances of the ordered set of removable dental appliances for the patient are worn sequentially by the patient.

In some examples, the techniques described with respect to process 26 may be embodied within a computer-readable storage medium, such as a computer-readable storage medium of client computing device 80 and/or computer 70. The computer-readable storage medium storing computerexecutable instructions that, when executed, configure a processor to perform the techniques described with respect to process 26.

Following the design of removable dental appliances 52, manufacturing facility 48 fabricates removable dental appliances 52 in accordance with the digital tooth structure data 46 and prescription data 47. Construction of removable dental appliances 52 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 18:
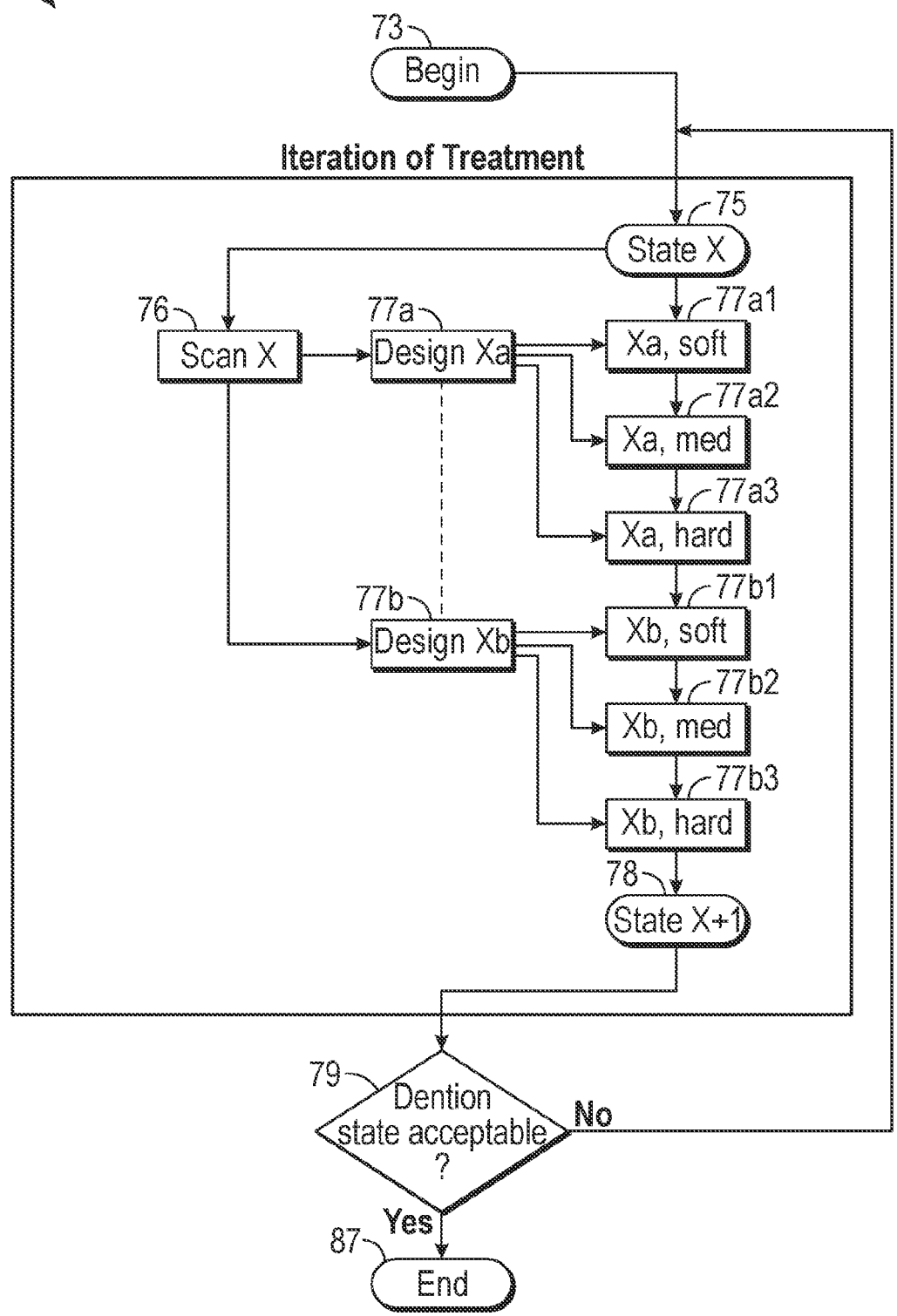
FIG. 18 is a flow diagram illustrating successive iterations of treatment using an ordered set of removable dental appliances.

FIG. 18 is a flow diagram 71 illustrating successive iterations of treatment using an ordered set of removable dental appliances. The ordered set of removable dental appliances is configured to reposition one or more teeth of a patient. In various examples, the ordered set of removable dental appliances may include one or more of removable dental appliances described herein. Accordingly, treatment may feature a plurality of the removable dental appliances described herein and need not be limited to iterations of one particular dental appliance embodiment. In one exemplary implementation, the treatment may initially begin with iterations of one or more removable dental appliance described herein and, once the patient's teeth have moved a certain desired amount, treatment may continue with iterations of removable dental appliance described herein.

In block 73, treatment begins with the first iteration of treatment. At the beginning of the first iteration of treatment, the patient's teeth are at their initial positions as represented by dentition state X in block 75. In block 76, a scan of the patient's teeth are taken to facilitate the design of the ordered set of removable dental appliances. From the scan of patient's teeth, a computer determines two different shapes and dimensions for removable dental appliances in the ordered set: design 77a and design 77b. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. The computer may determine two different shape and dimensions for removable dental appliances in the ordered set by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses and other dimensions of spring-like elements of the removable dental appliances in the ordered set to produce the forces required to move the patient's teeth from the initial positions to their desired positions.

The modeled forces applied by removable dental appliances in the ordered set may further be based on the incremental positional movements of the patient's teeth during the treatment. In this manner, the computer may design shape and dimensions for each of the removable dental appliances in the ordered set according to expected forces applied on the teeth for the predicted positions during the treatment when the removable dental appliances in the ordered set is to be worn by the patient.

In some examples, more than one, such as three, different removable dental appliances in the set of removable dental appliances can be manufactured using each of the two different shapes and dimensions to produce six removable dental appliances in the set of removable dental appliances. The first through third dental appliances within the ordered set of dental appliances are of the same shape and dimensions, but comprise materials with different stiffness characteristics. The second and third dental appliances have higher stiffness characteristics than the first dental appliance, and the third dental appliance also having higher stiffness characteristics than second dental appliance. Likewise, the fourth through sixth dental appliances within the ordered set of dental appliances are of the same shape and dimensions, but comprise materials with different stiffness characteristics. The fifth and sixth dental appliances having higher stiffness characteristics than fourth dental appliance, and the sixth dental appliance also having higher stiffness characteristics than fifth dental appliance. In some examples, the first dental appliance may have the same stiffness characteristics as the fourth dental appliance.

Likewise, in some examples, the second dental appliance may have the same stiffness characteristics as the fifth dental appliance. Further, in some examples, the third dental appliance may have the same stiffness characteristics as the sixth dental appliance.

In one exemplary treatment methodology, the first removable dental appliance 77a1 in the ordered set of removable dental appliances is made from a relatively soft material, such as a relatively soft polymeric material. The first removable dental appliance in the ordered set of removable dental appliances conforms to design 77a, and is made from a relatively soft material, such as a relatively soft polymeric material. The second removable dental appliance 77a2 in the ordered set of removable dental appliances conforms to design 77a, and is made from a material of medium stiffness, such as a relatively stiffer polymeric material than with the first removable dental appliance in the ordered set of removable dental appliances. The third removable dental appliance 77a3 in the ordered set of removable dental appliances conforms to design 77a, and is made from a material of high stiffness, such as a relatively stiffer polymeric material than with the second removable dental appliance in the ordered set of removable dental appliances. The fourth removable dental appliance 77b1 in the ordered set of removable dental appliances conforms to design 77b, and is made from a relatively soft material. The fifth removable dental appliance 77b2 in the ordered set of removable dental appliances conforms to design 77b, and is made from a material of medium stiffness. The sixth removable dental appliance 77b3 in the ordered set of removable dental appliances conforms to design 77b, and is made from a material of high stiffness.

The first through sixth removable dental appliances in the ordered set of removable dental appliances are worn in sequence over time by the patient. For example, each of the removable dental appliances in the ordered set of removable dental appliances may be worn between about 2 weeks and about 12 weeks, such as between about 3 weeks and about 10 weeks or between about 4 weeks and about 8 weeks. Following the treatment plan using the first through sixth removable dental appliances, the patient's teeth are at their final positions for the first iteration of treatment as represented by block 78, which shows the detention state X+1.

In block 79, the patient may return to the clinician who may evaluate the result of the first iteration of treatment. In the event that the first iteration of treatment has resulted in satisfactory final placement of the patient's teeth, the treatment may be ended in block 87. However, if the first iteration of treatment did not complete the desired movement of the patient's teeth, one or more additional iterations of treatment may be performed, and the process can continue to block 73. To begin the next iteration of treatment, the clinician may take another scan of the patient's teeth to facilitate the design of the ordered set of removable dental appliances in block 76. In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of flow diagram 71 represent one specific example, and a variety of modifications may be made to the techniques of flow diagram 71 within the spirit of this disclosure. For example, an ordered set of removable dental appliances may include more or less than six removable dental appliances. As another example, each removable dental appliance in the ordered set of removable dental appliances may have unique shapes and dimensions.

LIST OF ILLUSTRATIVE EMBODIMENTS

Embodiment 1

A dental appliance comprising:
a first polymeric shell portion having one or more cavities shaped therein to removably conform to one or more teeth;
at least one spacer; and
a first arch member coupled to the at least one spacer and configured to provide at least some of a force needed to reposition one or more teeth from a first orientation to a second orientation different from the first orientation.

Embodiment 2

The dental appliance of embodiment 1, wherein the first polymeric shell portion has a first surface having a first surface area defined by the one or more cavities and a second surface opposite the first surface and having a second surface area.

Embodiment 3

The dental appliance of embodiment 2, wherein a first spacer is coupled to the second surface of the first polymeric shell portion.

Embodiment 4

The dental appliance of embodiment 2, wherein a first spacer is disposed on the second surface of the first polymeric shell portion.

Embodiment 5

The dental appliance of any one of embodiments 2 to 4, wherein the first arch member overlaps at least 5% of the second surface area of the first polymeric shell portion.

Embodiment 5a

The dental appliance of any one of embodiments 2 to 4, wherein the first arch member overlaps at least 10% of the second surface area of the first polymeric shell portion.

Embodiment 6

The dental appliance of any one of embodiments 2 to 5, wherein the first arch member overlaps at least 20% of the second surface area of the first polymeric shell portion.

Embodiment 7

The dental appliance of any of embodiments 2 to 6, wherein the first arch member overlaps at least 30% of the second surface area of the first polymeric shell portion.

Embodiment 8

The dental appliance of any of embodiments 5 to 7, wherein the overlap excludes a surface of the first polymeric shell portion corresponding to the mesial surface of a tooth.

Embodiment 9

The dental appliance of any of embodiments 5 to 7, wherein the overlap excludes a surface of the first polymeric shell portion corresponding to the distal surface of a tooth.

Embodiment 10

The dental appliance of any of embodiments 3 to 9, further comprising a second spacer coupled to the first polymeric shell portion, wherein the first arch member is coupled to the second spacer and the first spacer.

Embodiment 11

The dental appliance of any of embodiments 1 to 10, further comprising a second polymeric shell portion having one or more cavities shaped therein to removably conform to one or more teeth, wherein the second polymeric shell portion has a first surface having a first surface area defined by the one or more cavities and a second surface opposite the first surface and having a second surface area.

Embodiment 12

The dental appliance of embodiment 11, further comprising a third spacer coupled to the second surface of the second polymeric shell portion.

Embodiment 13

The dental appliance of embodiment 12, wherein the first arch member is coupled to the third spacer.

Embodiment 14

The dental appliance of any of the preceding embodiments, wherein the one or more teeth include an occlusal or incisal surface, a facial surface, and a lingual surface.

Embodiment 15

The dental appliance of any of the preceding embodiments, wherein the first surface of the first polymeric shell portion contacts the occlusal or incisal surface, at least a portion of the facial surface, and at least a portion of the lingual surface of the one or more teeth.

Embodiment 16

The dental appliance of any of embodiments 2 to 15, wherein the first arch member overlaps at least a portion of the second surface opposite the first surface, wherein the first surface contacts at least a portion of the occlusal surface of the one or more teeth.

Embodiment 17

The dental appliance of any of the preceding embodiments, wherein the first arch member overlaps at least 40% of the second surface area corresponding to the facial surface of the one or more teeth.

Embodiment 18

The dental appliance of any of the preceding embodiments, wherein the first arch member overlaps at least 40% of the second surface area corresponding to the lingual surface of the one or more teeth.

Embodiment 19

The dental appliance of any of the preceding embodiments, wherein the first arch member overlaps at least 5% of the second surface area corresponding to the occlusal surface of the one or more teeth.

Embodiment 20

The dental appliance of any of embodiments 7 to 19, wherein the first arch member overlaps less than 100% of the second surface area of the first polymeric shell portion and the second polymeric shell portion.

Embodiment 21

The dental appliance of any of the preceding embodiments, wherein the first spacer is made from a first material and the first arch member is made from a second material.

Embodiment 22

The dental appliance of any of embodiments 1 to 20, wherein the first spacer is made from a first material and the first arch member is made from a second material, and the first polymeric shell portion is made from a third material.

Embodiment 23

The dental appliance of embodiment 21 or 22, wherein the first material is different from the second material.

Embodiment 24

The dental appliance of any of embodiments 21 to 23, wherein the first material has a lower modulus of elasticity relative to the second material.

Embodiment 25

The dental appliance of any of the preceding embodiments, wherein the first polymeric shell portion, the first spacer, and the first arch member are a single piece.

Embodiment 26

The dental appliance of any of the preceding embodiments, wherein the first polymeric shell portion, the second polymeric shell portion, the first spacer, the third spacer, and the first arch member are a single, continuous piece.

Embodiment 27

The dental appliance of any of the preceding embodiments, wherein the first arch member has a cut-out portion formed therewith which is configured to expose a portion of the first polymeric shell portion.

Embodiment 28

The dental appliance of embodiment 27, wherein the cut-out portion is reinforced with a flange surrounding the perimeter of the cut-out portion.

Embodiment 29

The dental appliance of embodiment 28, wherein the built-out portion is thicker relative to an average thickness of the first arch member.

Embodiment 30

The dental appliance of any of embodiments 27 to 29, wherein the cut out portion exposes at least 40% of the surface of the first polymeric shell portion corresponding to the occlusal surface of the tooth.

Embodiment 31

The dental appliance of any of the preceding embodiments, wherein the first spacer is coupled to the second surface of the first polymeric shell portion corresponding to the lingual surface of a tooth.

Embodiment 31a

The dental appliance of any embodiments 1 to 30, wherein the first spacer is coupled to the second surface of the first polymeric shell portion corresponding to the facial surface of a tooth.

Embodiment 32

The dental appliance of any of embodiments 1 to 30, wherein the first spacer is coupled to the second surface of the first polymeric shell portion corresponding to the occlusal surface of a tooth.

Embodiment 33

The dental appliance of any of the preceding embodiments, further comprising a fourth spacer coupled to the first polymeric shell portion.

Embodiment 34

The dental appliance of embodiment 33, wherein the first arch member is coupled to the fourth spacer.

Embodiment 34a

The dental appliance of embodiment 34, wherein the second polymeric shell portion comprises a fifth spacer coupled to the first arch member.

Embodiment 35

The dental appliance of any of embodiments 10 to 34, wherein the second spacer is coupled to a portion of the second surface of the second polymeric shell portion corresponding to the occlusal surface of a tooth.

Embodiment 36

The dental appliance of any of the preceding embodiments, further comprising a second arch member.

Embodiment 37

The dental appliance of embodiment 36, wherein the second arch member is coupled to the second spacer.

Embodiment 37a

The dental appliance of embodiment 36, wherein the second arch member is coupled to the fifth or the third spacer of the second polymeric shell portion.

Embodiment 38

The dental appliance of any of the preceding embodiments, wherein the first spacer has a modulus of elasticity no greater than the first arch member.

Embodiment 39

The dental appliance of any of the preceding embodiments, wherein the first spacer has a non-zero thickness.

Embodiment 40

The dental appliance of any of the preceding embodiments, wherein the first spacer has a height defined from the second surface of the first polymeric shell portion to the first arch member.

Embodiment 41

The dental appliance of any of the preceding embodiments, wherein the first spacer has a height of no greater than 4 mm.

Embodiment 42

The dental appliance of any of the preceding embodiments, wherein the height of the first arch member is defined as a distance from a gingival-most edge of the first arch member to an occlusal-most edge of the first arch member.

Embodiment 43

The dental appliance of any of the preceding embodiments, wherein the height is defined as a distance from a gingival-most edge of the first arch member to an occlusal-most surface of the first arch member, wherein at least a portion of the first arch member overlaps at least one of a lingual surface of the tooth shell or a facial surface of the tooth shell, and wherein at least a portion of the first arch member overlaps at least a portion of the occlusal surface of the tooth shell.

Embodiment 44

The dental appliance of any of the preceding embodiments, wherein the first arch member is formed from a polymeric component.

Embodiment 45

The dental appliance of embodiment 44, wherein the first arch member has a lower fracture point than yield point.

Embodiment 46

The dental appliance of embodiment 44 or 45, wherein the first arch member comprises a polyurethane segment.

Embodiment 47

The dental appliance of embodiment 44 or 45, wherein the first arch member comprises an acrylate or methacrylate segment.

Embodiment 48

The dental appliance of any of the preceding embodiments, wherein the first arch member transfers force between the first shell portion and the second shell portion to reposition the one or more teeth.

Embodiment 49

The dental appliance of any of the preceding embodiments, wherein the first arch member has one or more bends or twists in the relaxed state.

Embodiment 50

The dental appliance of any of the preceding embodiments, wherein the first arch member is ribbon-shaped.

Embodiment 51

The dental appliance of any of the preceding embodiments, wherein the first polymeric shell portion comprises a first polymeric component, and the first spacer comprises a second polymeric component.

Embodiment 52

The dental appliance of any of embodiments 1 to 50, wherein the first spacer comprises a first polymeric component, and the first arch member comprises a second polymeric component.

Embodiment 53

The dental appliance of embodiment 51 or 52, wherein the first polymeric component has a lower modulus of elasticity than the second polymeric component.

Embodiment 54

The dental appliance of any of the preceding embodiments, wherein the first spacer provides a gap formed between at least a portion of the first arch member and the first polymeric shell portion.

Embodiment 55

The dental appliance of embodiment 54, wherein the gap is sufficient to allow a prescribed tooth movement without causing interference between the first arch member and the first polymeric shell portion.

Embodiment 56

The dental appliance of embodiment 54 or 55, wherein the gap is sufficient to allow a prescribed tooth movement without allowing the first arch member to contact the first polymeric shell portion.

Embodiment 57

A method of orthodontic treatment comprising:

receiving a digital representation of a dental structure of a patient;

determining dimensions and shapes of a removable dental appliance based on forces required to modify the dental structure from an initial position to an adjusted position when the removable dental appliance is worn by the patient; and forming the removable dental appliance of any of embodiments 1 to 56.

Embodiment 58

The method of embodiment 57, wherein forming the dental appliance further comprises:

forming, from a polymeric material, at least one polymeric shell portion, each having at least one cavity shaped to removably conform to one or more teeth.

Embodiment 59

The method of embodiment 57 or 58, wherein forming the dental appliance further comprises:

forming, from a polymeric material, at least one spacer according to any of the preceding embodiments that are coupled to the at least one polymeric shell portion.

Embodiment 60

The method of any of embodiments 57 to 59, wherein forming the dental appliance further comprises forming the first arch member of embodiments 1 to 56.

Embodiment 61

The method of any of embodiment 59, wherein forming the at least one polymeric shell portion and at least one spacer occur at substantially the same time.

Embodiment 62

The method of embodiment 61, wherein forming the at least one polymeric shell portion and at least one spacer comprise printing the at least one polymeric shell portion and at least one spacer.

Embodiment 63

The method of any of the preceding embodiments, wherein forming the at least one polymeric shell portion, the at least one spacer, and the first arch member occur at substantially the same time.

Embodiment 64

The method of any of embodiments 60 to 63, wherein forming the at least one polymeric shell portion, the at least one spacer, and the first arch member comprise:

printing the at least one polymeric shell portion, printing the at least one spacer responsive to printing the at least one polymeric shell portion, and printing the first arch member responsive to printing the at least one spacer.

Embodiment 65

The method of any of the embodiments 57 to 64, wherein forming the dental appliance further comprises coupling the first spacer of any of the preceding embodiments to at least one of the shell portions in a position sufficient to perform the modification of the dental structure.

Embodiment 66

The method of any of the embodiments 57 to 65, further comprising attaching the dental appliance to the dental structure.

Embodiment 67

The method of embodiment 66, further comprising allowing the dental appliance to cause at least one of a translation or rotation to the dental structure according to the dimensions and shapes of the dental appliance.

Embodiment 68

A method of making a dental appliance, comprising:

applying a first layer of a first polymerizable component;

curing the first layer to form a first polymeric component with a first thickness;

applying a second layer of a second polymerizable component to the first layer; and curing the second layer to form a polymeric component with a second thickness.

Embodiment 69

The method of embodiment 68, wherein a thickness of the dental appliance is a sum of the first thickness and the second thickness.

Embodiment 70

The method of embodiment 68 or 69, wherein the first polymerizable component is different from the second polymerizable component.

Embodiment 71

The method of embodiments 68 to 70, wherein the first thickness is the same as the second thickness.

Embodiment 72

A method comprising:
retrieving, from a non-transitory machine-readable medium, data representing a digital object suitable for use in manufacturing a dental appliance of any of embodiments 1 to 56,
executing, by one or more processors, a 3D printing application interfacing with a manufacturing device using the data,
generating, by the manufacturing device, a physical object of the dental appliance.

Embodiment 73

A dental appliance generated using the method of embodiment 69.

Embodiment 74

A system comprising:
a display that displays a 3D model of the dental appliance of any of embodiments 1 to 56; and
one or more processors that, in response to the 3D model selected by a user, cause a 3D printer to create a physical object of the dental appliance.

Embodiment 75

A non-transitory machine readable medium having data representing a three-dimensional model suitable for use in manufacturing the dental appliance of any of embodiments 1 to 56, when accessed by one or more processors interfacing with a 3D printer, cause the 3D printer to create the dental appliance.

Embodiment 76

A system for orthodontic treatment comprising:
one or more processor circuits configured to:
receive a digital representation of a dental structure of a patient;
determine dimensions and shapes of a removable dental appliance based on forces required to modify the dental structure from an initial position to an adjusted position when the removable dental appliance is worn by the patient; and
provide instructions to a manufacturing device, and
the manufacturing device, wherein the manufacturing device forms the removable dental appliance of any of embodiments 1 to 56 based on the instructions.

Embodiment 77

The system of embodiment 76, wherein forming the dental appliance further comprises:
forming, from a polymeric material, at least one polymeric shell portion, each having at least one cavity shaped to removably conform to one or more teeth.

Embodiment 78

The system of embodiment 76 or 77, wherein forming the dental appliance further comprises:
forming, from a polymeric material, at least one spacer according to any of the preceding embodiments that are coupled to the at least one polymeric shell portion.

Embodiment 79

The system of any of embodiments 76 to 78, wherein forming the dental appliance further comprises
forming the first arch member of embodiments 1 to 56.

Embodiment 80

The system of embodiment 79, wherein forming the at least one polymeric shell portion and at least one spacer occur at substantially the same time.

Embodiment 81

The method of embodiment 80, wherein forming the at least one polymeric shell portion and at least one spacer comprise printing the at least one polymeric shell portion and at least one spacer.

Embodiment 82

The system of any of the preceding embodiments, wherein forming the at least one polymeric shell portion, the at least one spacer, and the first arch member occur at substantially the same time.

What is claimed is:
1. A dental appliance comprising:
a first polymeric shell portion having one or more cavities shaped therein to removably conform to one or more teeth, the shell having occlusal, lingual, and facial surfaces, wherein the first polymeric shell portion has a first surface having a first surface area defined by the one or more cavities and a second, outer surface opposite the first surface and having a second surface area;
one or two spacers coupled to the first polymeric shell portion on the second surface and a first arch member, wherein at least a first spacer of the one or two spacers provides an unfilled gap formed between at least an inner surface of the first arch member and the second surface of the first polymeric shell portion, wherein the gap is sufficient to allow a prescribed tooth movement without causing interference between of the first arch member and the first polymeric shell portion; and
the first arch member configured to provide at least some of a force needed, in cooperation with the one or two spacers, to rotate one or more teeth from a first orientation to a second orientation different from the first orientation, the first arch member selected from a band and a partial shell aligner, where the first arch member overlays at least 10% of the second surface area of the first polymeric shell portion,
wherein the one or two spacers are integrally formed with the first arch member and wherein the first arch mem- ber does not overlay at least one of the occlusal, lingual, and facials surfaces of the shell.

2. The dental appliance of claim 1, wherein the first arch member overlays at least 20% of the second surface area of the first polymeric shell portion.

3. The dental appliance of claim 2, wherein the first arch member overlays at least 30% of the second surface area of the first polymeric shell portion.

4. The dental appliance of claim 1, wherein the one or two spacers comprise a first spacer and a second spacer coupled to the first polymeric shell portion.

5. The dental appliance of claim 1, further comprising a second arch member coupled to the first polymeric shell portion.

6. The dental appliance of claim 1, wherein the first surface of the first polymeric shell portion contacts at least a portion of an occlusal surface of the one or more teeth.

7. The dental appliance of claim 1, wherein the first polymeric shell portion, one or two spacers, and arch member are integrally formed.

8. The dental appliance of claim 1, further comprising a second polymeric shell portion having one or more cavities shaped therein to removably conform to one or more teeth, wherein the second polymeric shell portion has a first surface defined by the one or more cavities, and a second surface opposite the first surface.

9. The dental appliance of claim 1, wherein the first arch member only overlays one of the following: a) at least a portion of the facial surfaces of the shell, (b) at least a portion of the lingual surfaces of the shell; (c) at least a portion of the lingual and occlusal surfaces of the shell; and d) at least a portion of the facial and occlusal surfaces of the shell.

10. The dental appliance of claim 1, wherein the gap has a non-uniform thickness.

11. A method comprising: receiving a digital representation of a dental structure of a patient; determining dimensions and shapes of a removable dental appliance of claim 1 based on forces required to modify the dental structure from an initial position to an adjusted position when the removable dental appliance is worn by the patient; and forming the removable dental appliance of claim 1 based on the dimensions and shapes.

12. The method of claim 11, wherein forming the dental appliance further comprises: forming, from a polymeric material, the polymeric shell portion having at least one cavity shaped therein to removably conform to one or more teeth; forming, from a polymeric material, the one or two spacers coupled to the polymeric shell portion; and forming a first arch member that is coupled to the one or two spacers.

13. The method of claim 12, wherein forming the at least one polymeric shell portions, at least one spacer, and the first arch member occur at substantially the same time.

14. The method of claim 13, wherein forming the at least one polymeric shell portion, the at least one spacer, and the first arch member comprise:
printing the at least one polymeric shell portion,
printing the at least one spacer responsive to printing the at least one polymeric shell portion, and
printing the first arch member responsive to printing the at least one spacer.

15. The method of claim 11, wherein forming the dental appliance further comprises coupling the first spacer to the polymeric shell portion in a position sufficient to perform modification of the dental structure.

16. The method of claim 11, further comprising attaching the dental appliance to the dental structure.

17. The method of claim 16, further comprising allowing the dental appliance to cause at least one of a translation or rotation to the dental structure according to dimensions and shapes of the dental appliance.

18. The method of claim 17, further comprising allowing the dental appliance to cause at least one of a translation, a rotation, and combinations thereof to the dental structure according to the dimensions and shapes of the dental appliance.

19. The method of claim 14, wherein printing the at least one polymeric shell portion comprises:
applying a first layer of a first polymerizable component;
curing the first layer to form a first polymeric component with a first thickness;
applying a second layer of a second polymerizable component to the first layer; and
curing the second layer to form a second polymeric component with a second thickness.

* * * * *